United States Patent
Toffey et al.

(10) Patent No.: US 11,995,732 B2
(45) Date of Patent: May 28, 2024

(54) COMPUTER PLATFORMS DESIGNED FOR IMPROVED ELECTRONIC EXECUTION OF ELECTRONIC TRANSACTIONS AND METHODS OF USE THEREOF

(71) Applicant: Broadridge Fixed Income Liquidity Solutions, LLC, Newark, NJ (US)

(72) Inventors: James Toffey, Newark, NJ (US); Spenser Huston, Newark, NJ (US); Vijay Mayadas, Newark, NJ (US); William Gartland, Newark, NJ (US); Thomas Duignan, Newark, NJ (US); Rick Montgomery, Newark, NJ (US); Albert John Cass, Newark, NJ (US); Suneel Nallagonda, Newark, NJ (US); Bryan Moore, Newark, NJ (US)

(73) Assignee: Broadridge Fixed Income Liquidity Solutions, LLC, Newark, NJ (US)

( * ) Notice: Subject to any disclaimer, the term of this patent is extended or adjusted under 35 U.S.C. 154(b) by 0 days.

(21) Appl. No.: 18/363,534

(22) Filed: Aug. 1, 2023

(65) Prior Publication Data
US 2023/0377075 A1 Nov. 23, 2023

Related U.S. Application Data

(63) Continuation of application No. 17/174,229, filed on Feb. 11, 2021, now Pat. No. 11,810,213, which is a (Continued)

(51) Int. Cl.
*G06Q 50/18* (2012.01)
*G06Q 40/04* (2012.01)
*G06Q 40/06* (2012.01)

(52) U.S. Cl.
CPC ........... *G06Q 50/188* (2013.01); *G06Q 40/04* (2013.01); *G06Q 40/06* (2013.01)

(58) Field of Classification Search
CPC ....... G06Q 50/188; G06Q 40/04; G06Q 40/06
(Continued)

(56) References Cited

U.S. PATENT DOCUMENTS 7,246,093 B1 * 7/2007 Katz ................. G06Q 40/04
705/37
7,546,268 B1 6/2009 Digiovanni et al.
(Continued)

FOREIGN PATENT DOCUMENTS

WO 2018/232494 A1 12/2018

OTHER PUBLICATIONS

"Pure Financial Academy Announces Launch of New, Free Introductory Day-Trading Course", M2 Presswire Jul. 1. 2014.*
(Continued)

*Primary Examiner* — Frantzy Poinvil
(74) *Attorney, Agent, or Firm* — GREENBERG TRAURIG, LLP

(57) ABSTRACT

The present disclosure includes systems and/or methods for receiving historical trading data associated with previously executed trade transactions for a financial instrument by a plurality of candidate invitee users. Trading intentions are received from the candidate invitee users and a score representative of a likelihood of successfully trading the financial instrument is modelled for each candidate invitee user based on inputting into a machine learning model the trading intentions and the historical trading data of each candidate invitee user. An electronic communication session is established for trading the financial instrument between an initiating user and selected invitee users using a stack software object that controls the electronic communication session according to a set of participation levels, and communications during the electronic communication session are coordinated, via the stack software object, to determine offers
(Continued)

from the selected invitee users that, when aggregated, achieve a maximum value for a predetermined position.

30 Claims, 22 Drawing Sheets

Related U.S. Application Data continuation of application No. 16/879,327, filed on May 20, 2020, now Pat. No. 10,922,773, which is a continuation of application No. 16/805,401, filed on Feb. 28, 2020, now abandoned.

(60) Provisional application No. 62/812,602, filed on Mar. 1, 2019.

(58) Field of Classification Search
USPC .................................... 705/3–44, 80
See application file for complete search history.

(56) References Cited

U.S. PATENT DOCUMENTS

| | | | |
|---|---|---|---|
| 7,734,518 B2 | 6/2010 | Toffey | |
| 7,813,977 B2* | 10/2010 | Heaton | G06Q 40/00 |
| | | | 705/35 |
| 7,840,480 B2 | 11/2010 | Kim-E | |
| 8,364,574 B1 | 1/2013 | May | |
| 8,438,089 B1 | 5/2013 | Wasserblat et al. | |
| 8,458,077 B2* | 6/2013 | Griffin | G06Q 40/12 |
| | | | 705/37 |
| 8,498,923 B2 | 7/2013 | Marynowski et al. | |
| 8,682,777 B1 | 3/2014 | Epstein et al. | |
| 9,613,379 B2* | 4/2017 | Courage | G06Q 40/04 |
| 9,641,558 B2 | 5/2017 | Olivier et al. | |
| 10,984,471 B1 | 4/2021 | Kerpel | |
| 11,270,380 B1* | 3/2022 | Katschinski | G06Q 40/04 |
| 11,354,747 B2 | 6/2022 | Magdelinic | |
| 2002/0046157 A1 | 4/2002 | Solomon | |
| 2005/0038723 A1 | 2/2005 | Nishimaki | |
| 2006/0080217 A1 | 4/2006 | Blackall et al. | |
| 2006/0190312 A1 | 8/2006 | Onuma et al. | |
| 2006/0294001 A1* | 12/2006 | Foster | G06Q 40/04 |
| | | | 705/37 |
| 2009/0106140 A1 | 4/2009 | De La Motte | |
| 2010/0082500 A1 | 4/2010 | Lutnick et al. | |
| 2010/0125519 A1* | 5/2010 | Devers | G06Q 40/04 |
| | | | 705/37 |
| 2011/0173113 A1* | 7/2011 | Jensen | G06Q 40/06 |
| | | | 705/37 |
| 2011/0270735 A1 | 11/2011 | Hammer et al. | |
| 2012/0022928 A1* | 1/2012 | Wu | G06Q 30/0209 |
| | | | 705/14.58 |
| 2012/0089502 A1 | 4/2012 | Dix et al. | |
| 2012/0233167 A1 | 9/2012 | Gates et al. | |
| 2012/0310857 A1 | 12/2012 | Nassif et al. | |
| 2013/0297474 A1* | 11/2013 | Creamer | G06T 19/20 |
| | | | 705/37 |
| 2014/0052601 A1 | 2/2014 | Lynn et al. | |
| 2014/0129404 A1 | 5/2014 | White et al. | |
| 2015/0120920 A1* | 4/2015 | Ferris | H04L 43/20 |
| | | | 709/224 |
| 2015/0127510 A1 | 5/2015 | Studnitzer et al. | |
| 2019/0073484 A1 | 3/2019 | Wilczynski et al. | |
| 2019/0080412 A1 | 3/2019 | Farnstrom | |
| 2020/0211108 A1 | 7/2020 | Pierce et al. | |
| 2020/0220936 A1 | 7/2020 | Rai et al. | |
| 2020/0279342 A1 | 9/2020 | Toffey et al. | |
| 2021/0182991 A1* | 6/2021 | Quinn | G06Q 20/386 |
| 2021/0365969 A1* | 11/2021 | Lieu | G06Q 30/0201 |
| 2022/0309583 A1* | 9/2022 | Melton | G06Q 40/04 |

OTHER PUBLICATIONS

International Search Report and Written Opinion from International Application No. PCT/US2020/020525 dated May 20, 2020.
Grody, "Revisiting electronic swaps trading", FOWeek, London, Euromoney Institutional Investor PLC, year (Tear 2015).
Logngo, "The Options Option: When and why should financial planners consider using options in client portfolios?", Financial Planning, New York, pp. 171-174 (Jun. 1, 2005).
International Search Report and Written Opinion from International Application No. PCT/US2020/020025 dated May 6, 2021.
EESR from European Patent Appln. No. 20767298.1 dated Oct. 26, 2022.

* cited by examiner

Step 3: Neural Network Input Data (current state)

| Source | | |
|---|---|---|
| Transaction Data | Security Master | Analytics (calculated based on Trade Time) |
| Customer Name (Block Trade) | Maturity Date | OAS |
| Trade Amount | Issue Date | OAS Duration |
| Trade Date | Industry 1 | OAS Convexity |
| Trade Time | Industry 2 | Option Value |
| Trade Price | Industry 3 | CR01 |
| | Industry 4 | |
| | Is_guaranteed | |
| | Is_factored | |
| | Is_put | |
| | Is_call | |
| | Amount Outstanding | |
| | Issue Amount | |
| | Debt Type Code | |

Requests

| Security | B/S | Size (000) | Allocated | % Allocated | Avg Sprd | Time |
|---|---|---|---|---|---|---|
| BBBY 4.915 08/01/2034 07586AB6 | Sell | 10,000 | 10,000 | 100% | +428 | 01:23 |
| GPS 5.950 04/12/2021 38476DAK4 | Sell | 12,000 | 11,000 | 92% | +198 | 02:10 |
| IP 7.300 11/15/2039 460146CF8 | Buy | 15,000 | 10,000 | 67% | +199 | 02:50 |
| OC 7.000 12/01/2019 890742AB7 | Buy | 13,000 | 8,000 | 62% | +243 | 05:00 |
| PRU 5.100 08/15/2043 74432QBY0 | Sell | 10,000 | 6,000 | 60% | +120 | 10:12 |
| F 6.625 10/01/2028 345370BY6 | Buy | 20,000 | 14,000 | 70% | +277 | 11:45 |

Open Invites

| Security | B/S | Size (000) | Allocated | % Allocated | Avg Sprd | Time |
|---|---|---|---|---|---|---|
| WMB 7.5000 01/15/2031 909457BB6 | Sell | 4,000 | 3,000 | 75% | +207 | 02:25 |
| ALLY 4.250 04/15/2021 02006NBG4 | Sell | 12,000 | 12,000 | 100% | +154 | 03:41 |
| APC 7.950 06/15/2039 032511BG1 | Buy | 5,000 | 2,500 | 50% | +233 | 07:40 |
| AA 6.750 01/15/2028 022249AU0 | Buy | 11,000 | 7,000 | 64% | +325 | 12:00 |
| STX 4.750 06/01/2023 81180WAM4 | Sell | 3,600 | 1,250 | 35% | +180 | 17:29 |
| T 7.125 12/15/2031 17246RAJ5 | Buy | 10,000 | 1,000 | 10% | +242 | 18:16 |

Requests — Import Orders

| | Security | B/S | Size (000) | Sprd | LIQ | RFX |
|---|---|---|---|---|---|---|
| (7) | CAT 2.400 06/06/2022 14913QAA7 | Sell | 17,000 | +36 | 9 | RFX ⋯ |
| (8) | IBM 5.600 11/03/2039 38476DAK4 | Sell | 12,150 | +103 | 5 | RFX ⋯ |
| (8) | DE 3.900 06/09/2042 460146CF8 | Sell | 7,000 | +73 | 8 | RFX ⋯ |
| (1) | OXY 4.200 03/15/2048 674500CN3 | Sell | 11,750 | +109 | 7 | RFX ⋯ |
| (6) | OC 7.000 12/01/2036 890742AB7 | Sell | 11,200 | +243 | 4 | RFX ⋯ |
| (4) | APL 2.900 09/12/2027 607833OB3 | Sell | 15,010 | +74 | 9 | RFX ⋯ |
| (2) | VOYA 4.800 06/15/2046 92908OCA4 | Sell | 10,275 | +167 | 7 | RFX ⋯ |
| (8) | MSFT 3.300 02/06/2027 60491BY9 | Sell | 18,050 | +62 | 4 | RFX ⋯ |
| (6) | PRU 6.625 12/01/2037 74432QBO6 | Sell | 16,900 | +147 | 6 | RFX ⋯ |
| (7) | RJF 5.625 04/01/2024 754730AD1 | Sell | 12,600 | +110 | 7 | RFX ⋯ |
| (5) | GE 4.500 03/11/2044 360604BH5 | Sell | 15,500 | +179 | 5 | RFX ⋯ |
| (4) | VZ 8.000 06/01/2022 645767AY0 | Sell | 25,000 | +93 | 9 | RFX ⋯ |
| (5) | PEG 3.600 12/01/2047 74458QBT2 | Sell | 14,000 | +90 | 8 | RFX ⋯ |
| (4) | MRK 2.750 02/10/2025 58933YAR8 | Sell | 11,000 | +53 | 7 | RFX ⋯ |

| YOUR SELL INTENTIONS | | | | | | |
|---|---|---|---|---|---|---|
| Instrument | Direction | Size | Price/Spread | Liquidity Cloud Score | Score | RFX |
| VZ 8.000 06/01/2022 645767AY0 | Sell | 25m | +93 | 6 | 8 | RFX |
| BBBY 4.915 08/01/2034 075896AB6 | Sell | 1-5m | +80 to +85 | 4 | 7 | RFX |
| GPS 5.950 04/12/2021 38476DAK4 | Sell | 5m | +90 to +100 | 5 | 4 | RFX |
| IP 7.300 11/15/2039 46014GCF8 | Sell | 5m | +120 to +13- | 1 | 3 | RFX |
| MARK 2750 02/10/2025 68933YAR5 | Sell | 5-10m | +70 to +80 | 5 | 7 | RFX |
| CVX 1.961 03/03/2020 166764AR1 | Sell | 10m | +35 to +40 | 3 | 5 | RFX |
| WMT 4.000 04/11/2043 931142DG5 | Sell | 12m | +65 to +75 | 8 | 8 | RFX |
| CAT 2.400 06/06/2022 14913QAA7 | Sell | 4.5m | +30 | 3 | 4 | RFX |
| ALL 5.750 08/15/2053 020002BB6 | Sell | 10-15M | +25 to +30 | 4 | 2 | RFX |
| DE 3.900 06/09/2042 244199BF1 | Sell | 15m | +55 to +65 | 4 | 1 | RFX |

| YOUR SELL INTENTIONS | | | | | | |
|---|---|---|---|---|---|---|
| Instrument | Direction | Size | Price/Spread | Liquidity Cloud Score | Score | RFX |
| PEG 3.600 12/01/2047 74456QBT2 | Buy | 5m | +73 | 5 | 9 | RFX |
| OC 9.000 06/15/2019 690742AC5 | Buy | 0-1m | +120 to +130 | 3 | 5 | RFX |
| APL 2.900 09/12/2027 037833OB3 | Buy | 8-10m | +55 | 6 | 8 | RFX |
| GE 5.000 01/20/2066 389604BQ5 | Buy | 10m | +45 | 7 | 7 | RFX |
| VOYA 4.700 01/23/2048 929089AE0 | Buy | 6-10m | +140 | 5 | 4 | RFX |
| MSFT 3.300 02/06/2027 594918BY9 | Buy | 11m | +66 | 6 | 9 | RFX |
| RJF 4.950 07/15/2046 75473DAF6 | Buy | 2.8m | +84 | 4 | 7 | RFX |
| PRU 5.100 08/15/2043 74432QBY0 | Buy | 5+ m | +91 | 2 | 4 | RFX |
| OXY 4.200 03/15/2048 674688CN3 | Buy | 6.5M | +123 | 3 | 6 | RFX |

*FIG. 7*

| YOUR SELL INTENTIONS | Add a Security | | | | | |
|---|---|---|---|---|---|---|
| Instrument | Direction | Size | Price/Spread | Liquidity Cloud Score | Score | RFX |
| VZ 8.000 06/01/2022 645767AY0 | Sell | 25m | +93 | 6 | 8 | RFX |
| BBBY 4.915 08/01/2034 075866AB6 | Sell | 1-5m | +80 to +85 | 4 | 7 | RFX |
| GPS 5.950 04/12/2021 38476DAK4 | Sell | 5m | +90 to +100 | | | |
| IP 7.300 11/15/2039 460146CF8 | Sell | 5m | +120 to +13- | | | |
| MARK 2750 02/10/2025 68933YAR5 | Sell | 5-10m | +70 to +80 | | | |
| CVX 1.961 03/03/2020 166764AR1 | Sell | 10m | +35 to +40 | 8 | 8 | RFX |
| WMT 4.000 04/11/2043 931142DG5 | Sell | 12m | +65 to +75 | 3 | 7 | RFX |
| CAT 2.400 06/06/2022 14913QAA7 | Sell | 4.5m | +30 | 4 | 2 | RFX |
| ALL 5.750 08/15/2053 020002BB6 | Sell | 10-15M | +25 to +30 | 4 | 1 | RFX |
| DE 3.900 06/09/2042 244199BF1 | Sell | 15m | +55 to +65 | | | |

| YOUR BUY INTENTIONS | Add a Security | | | | | |
|---|---|---|---|---|---|---|
| Instrument | Direction | Size | Price/Spread | Liquidity Cloud Score | Score | RFX |
| PEG 3.600 12/01/2047 74456QBT2 | Buy | 5m | +73 | 5 | 9 | RFX |
| OC 9.000 06/15/2019 690742AC5 | Buy | 0-1m | +120 to +130 | 3 | 5 | RFX |
| | | 8-10m | +55 | 6 | 8 | RFX |
| | | 10m | +45 | 7 | 7 | RFX |
| | | 6-10m | +140 | 5 | 4 | RFX |
| | | 11m | +66 | 6 | 9 | RFX |
| RJF 4.950 07/15/2046 75473DAF6 | Buy | 2.8m | +84 | 4 | 7 | RFX |
| PRU 5.100 08/15/2043 74432QBY0 | Buy | 5+m | +91 | 2 | 4 | RFX |
| OXY 4.200 03/15/2048 674688CN3 | Buy | 6.5M | +123 | 3 | 6 | RFX |

LTX Liquidity Cloud Score Update — BUY Intention Update
CAT 2.400 06/06/2022
14913QAA7
Previous: 4  New: 7  RFX

FIG. 8

BUYSIDE VIEW

RFX Ticket ✕

VZ 8.000 6/1/2022      5Y UST 2.75 4/2023
64576AY0      Outright

| Direction | Qty (000) | Committed Level (bps) | Time |
|---|---|---|---|
| SELL | 25,000 | +93 | 20 Mins |
| | 25,000,000 | Est px.123.45 | |

| Fill Type | Min Fill (000) | Buy Now Spread (bps) | Stack |
|---|---|---|---|
| Partial | 250 | +90 | Locked |
| | 25,000,000 | Est px.123.45 | |

Jefferies | DEALER | X DEALER Y Z | MUFG | RAYMOND JAMES | DEALER A B C | DEALER 123 | >

∧ More Parameters

| Transaction Type | Pricing Protocol | Settlement Date | Transaction Fee (bps) |
|---|---|---|---|
| RFX | Spread | T+2 | 1.0 |

| Cloud Matches | Max # of Invites | Benchmark | |
|---|---|---|---|
| On / Off | 25 | 5Y UST 2.75 4/2023 | 912828EY7 |

| Spot Time | Spot Time | | |
|---|---|---|---|
| Immediate | Auto | Outright / Cross | |

Comment      Comments do not affect trade terms

Save      Send RFX

*FIG. 9*

RFX DEALER VIEW

DEALER: X Y Z

Activity Monitor

YOUR HOSTED RFX

| Status | Client | Side | Size (000) | Security | Committed | Trade Now | Trans Fee | Custs | Stack Fill% | Fill Lvl | Fill Amount | Time | Actions |
|---|---|---|---|---|---|---|---|---|---|---|---|---|---|
| Req | GBAM | Sell | 25,000 | VZ 8.000 06/01/2022 | +93 | +90 | 1.0 | 25 | --- | --- | --- | 0:01 | Launch Pass |
| LIVE | FUND1 | Sell | 17,000 | VOYA 4.800 06/15/2046 | +169 | +164 | 1.0 | 21 | 91% | +169 | 15,500 | 00:04:23 | |
| LIVE | AM#1 | Sell | 20,000 | PRU 5.100 08/15/2043 | +121 | +116 | 1.0 | 18 | 85% | +121 | 17,000 | 00:07:04 | |
| LIVE | AM#7 | Buy | 10,000 | GE 5.875 01/14/2038 | +177 | +182 | 1.0 | 28 | 100% | +179 | 10,000 | 00:11:25 | |
| Done | FUND9 | Buy | 15,000 | ALL 5.55 05/09/2035 | +112 | +117 | 1.0 | 20 | 100% | +115 | 15,000 | 12:36:00 PM | |
| Done | IM123 | Sell | 12,500 | MSFT 5.300 02/08/2041 | +83 | +78 | 1.0 | 16 | 100% | +82 | 12,500 | 12:20:00 PM | |

GBAM has selected you as RFX Dealer
SELL 25,000,000 VZ 8.000 06/01/2022

| Committed | Trade Now | Transe Fee | Custs |
|---|---|---|---|
| +93 | +90 | 1.0 | 25 |

PASS    Launch    View Details

*FIG. 10*

AUTO BID

RFX Stack ✕

20:00

X DEALER
Y
Z

VZ 8.000 06/01/2022
64576AY0 Settlement Date: T+2

5Y UST 2.75 4/2023
*Set Spread Parameters*

Qty
$25,000,000
Min Fill: $250,000

Committed Level
+92bps

Buy Now Spread
+89bps [Buy Now]

( You Bid ) Auto Bid )

| Qty (000) | | Spread (bps) | Fill Type ⌄ |

[ Clear ]    [ Submit Bid ]

COMPUTER PLATFORMS DESIGNED FOR IMPROVED ELECTRONIC EXECUTION OF ELECTRONIC TRANSACTIONS AND METHODS OF USE THEREOF

CROSS-REFERENCE TO RELATED APPLICATIONS

This application is a nonprovisional application claiming priority to U.S. Pat. No. 11,810,213, filed Feb. 11, 2021 and issued on Nov. 7, 2023, which claims priority to U.S. Pat. No. 10,922,773 issued on Feb. 16, 2021, which claims priority to U.S. Non-Provisional patent application Ser. No. 16/805,401 filed on Feb. 28, 2020, which claims priority to U.S. Provisional Patent Application Ser. No. 62/812,602 filed on Mar. 1, 2019, incorporated herein by reference in its entirety.

TECHNICAL FIELD

In some embodiments, the present disclosure is related to computer-implemented methods and computer systems for an electronic transaction platform.

BACKGROUND OF THE INVENTION

Communications can be performed over networks between client devices. The communications are defined by protocols enabling the exchange of packets of information. In network communications amongst groups, these packets of information may be viewable by all parties. However, typically, all information is available to all parties, all parties are typically allowed the same level of participation. Networking and network communications technologies provide insufficient control of information access.

BRIEF SUMMARY OF THE INVENTION

In some embodiments, the present disclosure provides an exemplary technically improved computer-based method that includes at least the following steps of receiving, by at least one processor, a session request from an initiating user, where the session request includes an electronic communication session over a cloud computing network for a transfer of a quantity of a position in at least one financial instrument from the initiating user to at least one session invitee; generating, by the at least one processor, a list of potential intermediate entities based at least in part on a respective dealer liquidity score associated with each potential intermediate entity of the potential intermediate entities; receiving, by the at least one processor, a selection from the initiating user identifying a selected intermediate entity of the potential intermediate entities to mediate the electronic communication session; enabling, by the at least one processor, the initiating user and the selected intermediate entity to negotiate attributes of the electronic communication session; generating, by the at least one processor, based on the attributes of the electronic communication session, a stack software object controlling a plurality of participation levels in the electronic communication session for each selected invitee of a set of selected invitees, where the plurality of participation levels includes: i) a locked stack participation level, ii) an unlocked stack participation level, and iii) an open stack participation level; receiving, by the at least one processor, an invitee selection from the selected intermediate entity indicating the set of selected invitees selected from a plurality of potential invitees; establishing, by the at least one processor, the electronic communication session, associated with an intermediary computing device of the selected intermediate entity, where the electronic communication session includes the stack software object; preventing, by the at least one processor, a respective invitee computing device associated with each respective selected invitee from accessing activities in the electronic communication session unless the respective selected invitee satisfies at least one first predetermined parameter based on the locked stack participation level of the stack software object; enabling, by the at least one processor, an initiating computing device associated with the initiating user to access in the electronic communication setting at a reserve level while preventing each respective invitee computing device associated with each respective selected invitee from accessing the activities in the electronic communication session unless the respective selected invitee satisfies at least one second predetermined parameter based on the unlocked stack participation level of the stack software object; and enabling, by the at least one processor, the initiating computing device associated with the initiating user and each respective invitee computing device associated with each respective selected invitee to access the activities in the electronic communication session based on the open stack participation level of the stack software object.

In some embodiments, the present disclosure provides another exemplary technically improved computer-based system that includes at least the following components of at least one processor. The at least one processor is configured to: receive a session request from an initiating user, where the session request includes an electronic communication session over a cloud computing network for a transfer of a quantity of a position in at least one financial instrument from the initiating user to at least one session invitee; generate a list of potential intermediate entities based at least in part on a respective dealer liquidity score associated with each potential intermediate entity of the potential intermediate entities; receive a selection from the initiating user identifying a selected intermediate entity of the potential intermediate entities to mediate the electronic communication session; enable the initiating user and the selected intermediate entity to negotiate attributes of the electronic communication session; generate based on the attributes of the electronic communication session, a stack software object controlling a plurality of participation levels in the electronic communication session for each selected invitee of a set of selected invitees; where the plurality of participation levels includes: i) a locked stack participation level, ii) an unlocked stack participation level, and iii) an open stack participation level; receive an invitee selection from the selected intermediate entity indicating the set of selected invitees selected from a plurality of potential invitees; establish the electronic communication session, associated with an intermediary computing device of the selected intermediate entity, where the electronic communication session includes the stack software object; prevent a respective invitee computing device associated with each respective selected invitee from accessing activities in the electronic communication session unless the respective selected invitee satisfies at least one first predetermined parameter based on the locked stack participation level of the stack software object; enable an initiating computing device associated with the initiating user to access in the electronic communication setting at a reserve level while preventing each respective invitee computing device associated with each respective selected invitee from accessing the activities in the electronic communication session unless the respective selected invitee satisfies at least one second predetermined parameter based on the unlocked stack participation level of the stack software object; and enable the initiating computing device associated with the initiating user and each respective invitee computing device associated with each respective selected invitee to access the activities in the electronic communication session based on the open stack participation level of the stack software object.

BRIEF DESCRIPTION OF THE SEVERAL VIEWS OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIGS. 1A-19 show one or more schematic flow diagrams, certain computer-based architectures, and/or screenshots of various specialized graphical user interfaces which are illustrative of some exemplary aspects of at least some embodiments of the present disclosure.

DETAILED DESCRIPTION

Figure 1A:
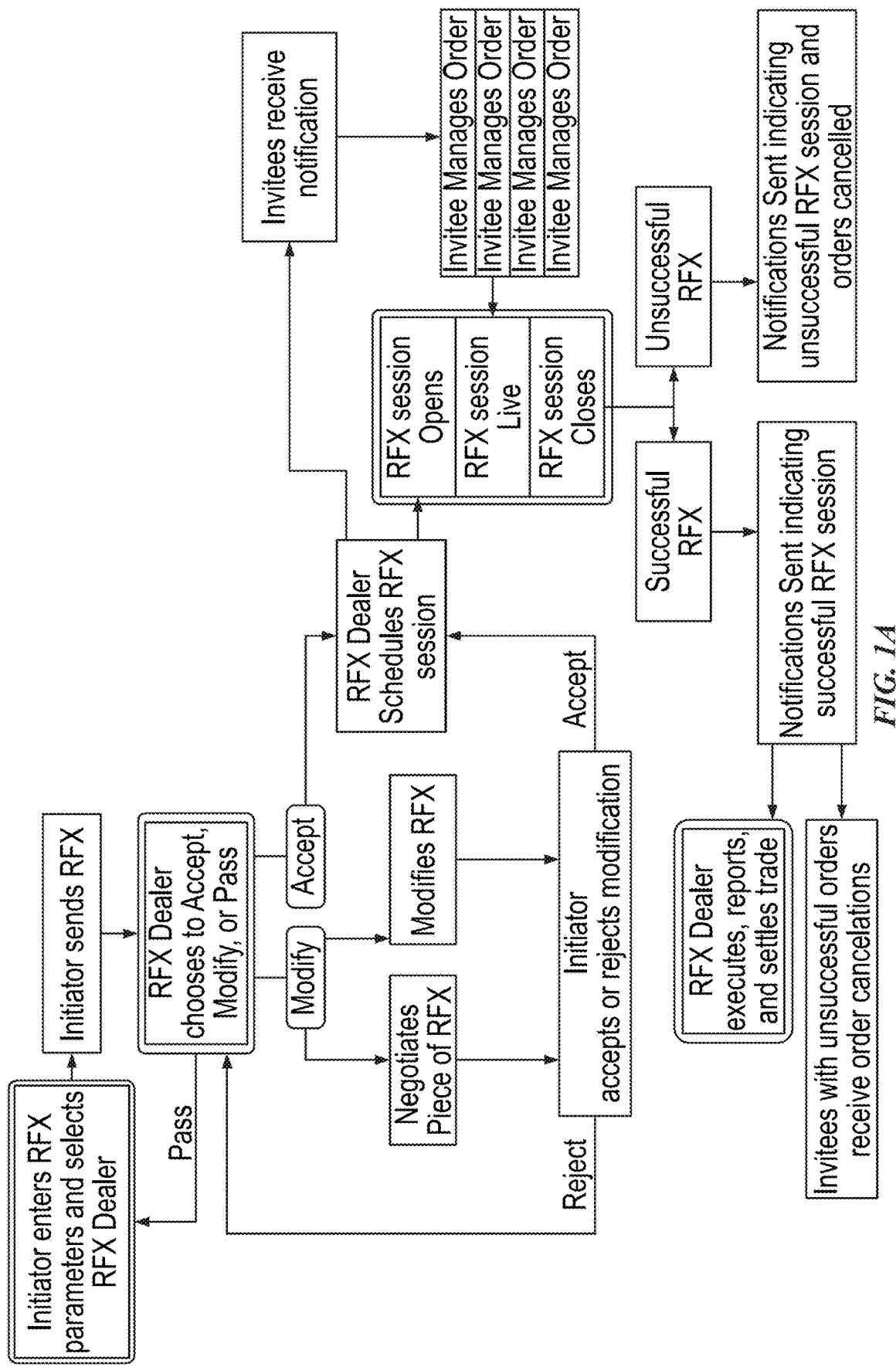

Embodiments of the present disclosure, briefly summarized above and discussed in greater detail below, can be understood by reference to the illustrative embodiments of the present disclosure depicted in the appended drawings. It is to be noted, however, that the appended drawings illustrate only typical embodiments of this present disclosure and are therefore not to be considered limiting of its scope, for the present disclosure may admit to other equally effective embodiments.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process. For example, in some embodiments, an event occurs in real-time if a time difference between a first time when an exemplary order is received and a second time when a dealer makes the exemplary offer for counterbidding is no more than 10 minutes. For example, in some embodiments, an event occurs in real-time if a time difference between a first time when an exemplary order is received and a second time when a dealer makes the exemplary offer for counterbidding is no more than 1 second. For example, in some embodiments, an event occurs in real-time if a time difference between a first time when an exemplary order is received and a second time when a dealer makes the exemplary offer for counterbidding is between less than 1 second and 10 minutes.

As used herein, the term "dynamically" means that events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc. As used herein, the terms "dynamically" and automatically are used interchangeably and have the same meaning.

As used herein, the term "runtime" corresponds to any behaviour that is dynamically determined during an execution of a software application or at least a portion of software application.

In some embodiments, the inventive specially programmed computing systems with associated devices are configured to operate in the distributed network environment, communicating over a suitable data communication network (e.g., the Internet, etc.) and utilizing at least one suitable data communication protocol (e.g., IPX/SPX, X.25, AX.25, AppleTalk™, TCP/IP (e.g., HTTP), etc.). Of note, the embodiments described herein may, of course, be implemented using any appropriate hardware and/or computing software languages. In this regard, those of ordinary skill in the art are well versed in the type of computer hardware that may be used, the type of computer programming techniques that may be used (e.g., object-oriented programming), and the type of computer programming languages that may be used (e.g., C++, Objective-C, Swift, Java, JavaScript). The aforementioned examples are, of course, illustrative and not restrictive.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budgets, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor.

As used herein, the term "user" shall have a meaning of at least one user.

As used herein, the term "backstop" identifies a bid or offer (an electronic firm trading submission), depending on the direction of an exemplary inventive electronic communication session detailed that may be provided by the electronic communication dealer at the start of the electronic communication session, prior to invitees being able to place a bid/offer. For example, the price and/or size provided by the electronic communication dealer is firm and will result in a trade at the conclusion of the electronic communication, unless the electronic communication dealer's bid/offer is not allocated in the electronic communication due to more competitive bids/offers.

As used herein, the term "buyside" identifies market participants in securities which generally refer to investment firms that purchase securities, such as asset managers. For example, buyside market participants may include, but are not limited to, mutual funds, pension funds, family offices, hedge funds, and private equity funds.

As used herein, the term "committed level" identifies a firm price level set by the initiating user that the initiating user will trade (i.e. buy or sell depending on the side) the specific financial instrument (e.g., corporate bond).

As used herein, the term "dealer" identifies a market participant that acts as an intermediary in the securities markets by buying and/or selling securities on its own account before selling the securities to a customer and provides the sellers, buyers or both, access to the settlement system for the trades that are executed. In some embodiments, these are characterized as "riskless principal" trades.

As used herein, the term "intermediate entity" identifies a single dealer associated with the particular electronic communication session who accepted an invitation from the initiating user and/or from exemplary inventive electronic execution-mediating platform of the present disclosure to act as the dealer to host an electronic communication session. In some embodiments, the dealer may run electronic communication sessions where the dealer is both the initiating user and electronic communication dealer As used herein, the term "initiating user" identifies a user that desires to initiate an electronic inventive electronic communication session and who will either purchase or sell corporate bonds at the conclusion of the electronic communication session if the initiating user's pre-determined parameters are met. For example, an exemplary initiating user may be a member of the membership network of users that the exemplary inventive electronic execution-mediating platform of the present disclosure is configured to operate.

As used herein, the term "dealer" identifies a market participant that acts as an intermediary in the securities markets by buying and/or selling securities on its own account before selling the securities to a customer.

As used herein, the term "intermediate user" identifies a single dealer associate with the particular electronic communication session who accepted an invitation from the initiating user and/or from the exemplary inventive electronic execution-mediating platform of the present disclosure to act as the dealer to host an electronic communication session.

As used herein, the term "invitee" identifies a party that is invited to act as a invitee to an electronic inventive electronic communication session (opportunity to bid or offer, depending on the direction of the electronic communication session, on the corporate bond that is the subject of the electronic communication session) based at least in part on i) selection by the electronic communication dealer; ii) expressed Pre-Trade intention; and/or iii) determination by the exemplary inventive electronic execution-mediating platform of the present disclosure based at least in part on data of the liquidity database.

As used herein, the term "pre-trade intention" identifies an expression of interest (electronically set preference and/or electronic submission) by a user in buying and/or selling a particular financial instrument (e.g., corporate bond) at a given price for a given size.

As used herein, the terms "liquidity monitor" and "liquidity dashboard" interchangeably identify one or more specialized inventive graphical user interfaces (GUIs) that display a liquidity score for each financial instrument (e.g., each corporate bond).

As used herein, the term "electronic communication dealer's liquidity score" identifies a calculated score assigned to each electronic communication dealer for each financial instrument (e.g., each corporate bond) and/or a calculate score based on data including, but not limited to, historical trading data of similar corporate bonds by each respective dealer, as determined by the exemplary inventive electronic execution-mediating platform of the present disclosure.

As used herein, the terms "financial instrument's liquidity score" or "corporate bond's liquidity score" identifies a calculated score assigned to each financial instrument (e.g., each corporate bond) based on data including, but not limited to, historical trading data of the particular corporate bond and/or similar corporate bond(s), as determined by the exemplary inventive electronic execution-mediating platform of the present disclosure.

As used herein, the terms "liquidity cloud" identifies a combination of specifically one or more programmed software/hardware modules in communication with one or more electronic distribute and/or centralized databases that may be programmed with suitable analytical logic detailed herein, and continuously updated with users' (e.g., members/users of the exemplary inventive electronic execution-mediating platform of the present disclosure) list of financial instruments (e.g., corporate bonds) that they have a specific interest in bidding/offering on (i.e. pre-trade intentions) in the event that another market participant initiates an electronic communication session. For example, members/users of the exemplary inventive electronic execution-mediating platform of the present disclosure are able to upload existing corporate bond positions that they want the exemplary inventive electronic execution-mediating platform of the present disclosure to provide analytics on to the liquidity cloud directly or from their Order Management System. For example, in some embodiments, once the corporate bond positions are added to the liquidity cloud, the liquidity cloud's analytics module may generate and present to a particular user a liquidity score, based on a number of factors, including but not limited to other market participants' pre-trade intentions uploaded to the liquidity cloud, that estimate the likelihood that there is contra interest in the individual corporate bond. For example, the user may be also provided with a liquidity score for each corporate bond position based on data including, but not limited to, TRACE data and user's historical data to determine how much liquidity there is in the market for that corporate bond. For example, in addition to uploading existing positions which they are interested in selling, clients can upload corporate bond positions that they would be interested in purchasing if they became available. In some embodiments, the availability of various liquidity scores allows the exemplary inventive electronic execution-mediating platform of the present disclosure to increase the speed of trade execution due to users' ability to make their decisions quicker (e.g., in real-time).

As used herein, the term "invitees" identifies invitees that have provided a bid or offer, depending on the direction of the particular electronic communication session.

As used herein, the term "stack GUI(s)" identifies one or more specialized inventive GUIs that is/are configured to display the price and size that invitees have submitted for the financial instrument (e.g., a corporate bond) that is the subject of a particular inventive electronic communication session.

As used herein, the term "TRACE" identifies the Trade Reporting and Compliance Engine hosted by FINRA which provides a historical perspective of the trade in over-the-counter markets for U.S. corporate bonds, agency debentures, asset-backed and mortgage backed security markets.

As used herein, the term "post-trade" identifies a state at the conclusion of a particular electronic communication session when the exemplary inventive electronic execution-mediating platform of the present disclosure is configured to generate electronic notifications to all invitees that received an allocation in the electronic communication session.

In some embodiments, the exemplary inventive electronic execution-mediating platform of the present disclosure is configured to allow initiating users to decide on which dealer to request to be the electronic communication dealer based at least in part on which dealer(s) each respective initiating user has an existing trading relationship and/or the dealers' liquidity scores. In some embodiments, the exemplary inventive electronic execution-mediating platform of the present disclosure is configured to require the initiating user to select a number of parameters including, but not limited to, the firm price at which the initiating user will buy or sell the selected corporate bond, the minimum size that needs to be filled for the initiating user to agree to buy or sell the selected corporate bond, and the criteria for allowing invitees to see invitee's submissions at or the stack GUI itself (i.e., locked, unlocked, open). In some embodiments, when the electronic communication dealer and the respective initiating user electronically agree on a number of parameters including but not limited to, transaction fee paid to the electronic communication dealer, the maximum number of invitees that the electronic communication dealer can invite, and the length of time of the electronic communication session. In some embodiments, the exemplary inventive electronic execution-mediating platform of the present disclosure is configured to allow the electronic communication dealer to select an option to either i) fill the full quantity of corporate bonds at a pre-determined price or ii) provide a backstop. In some embodiments, a "Buy Now" option may be employed that allows invited participants, provided they accept the full transaction amount, to immediately agree to the transaction.

For example, if the electronic communication dealer does not agree to fill the full quantity of the initiating user's electronic communication session, the electronic communication dealer will invite its selected invitees to participate in the electronic communication. In some embodiments, the electronic communication dealer's list of invitees may be informed by invitees' rankings generated by the exemplary inventive electronic execution-mediating platform of the present disclosure based on the information in the liquidity cloud (e.g., in an associated database) and/or the electronic communication dealer's own data. For example, additionally, unless the initiating user has requested otherwise, the exemplary inventive electronic execution-mediating platform of the present disclosure would also provide selected invitees that are able to be invitees in the particular electronic communication session based at least in part on their pre-trade intentions in specific financial instruments (e.g., corporate bonds).

In some embodiments, an electronic execution-mediating cloud platform may be configured to facilitate communication amongst parties with improved control over access to information and permission to participate compared to technology known to the field of electronic communication and networking. In some applications, it is beneficial to control which participants participate in a communication session and the types of actions those participants may take and the information they can view. Using improved technological mechanisms, the electronic communication session can be used to prevent information leakage using technological solutions including a stack software object that controls the participation levels of the parties.

In some embodiments, an exemplary inventive electronic execution-mediating platform of the present disclosure is configured based at least in part on an exemplary inventive electronic communicating protocol that allows users of the exemplary inventive electronic execution-mediating platform to electronically trade various financial instruments such as, without limitation, corporate bonds. In some embodiments, the exemplary inventive electronic execution-mediating platform of the present disclosure is configured based at least in part on the exemplary inventive electronic communicating protocol that allows users to utilize one or more inventive specifically-programmed graphical user interfaces (specialized GUIs) to engage in an innovative electronic-based competitive bidding of the present disclosure (the inventive electronic request for execution process (electronic communication process)) for one or more particular trading offers involving one or more financial instruments such as corporate bonds. In some embodiments, the exemplary inventive electronic execution-mediating platform of the present disclosure is configured based at least in part on the exemplary inventive electronic communicating protocol that models the trading workflow to be operated through messages that follow the Financial Information Exchange Protocol (FIX) standard.

In some embodiments, the FIX standard includes an electronic communications protocol for international real-time exchange of information related to securities transactions and markets. FIX includes standards for message encodings and session protocols that may be adapted for use with the electronic communication session of the exemplary inventive electronic execution-mediating platform of the present disclosure.

In some embodiments, the FIX standard includes use of the FIX Adapted for Streaming (FAST) protocol. The FAST protocol facilitates one to compress data organized in accordance with FIX protocol ("the FIX data") to minimize the size of the transported FIX data.

Figure 1B:
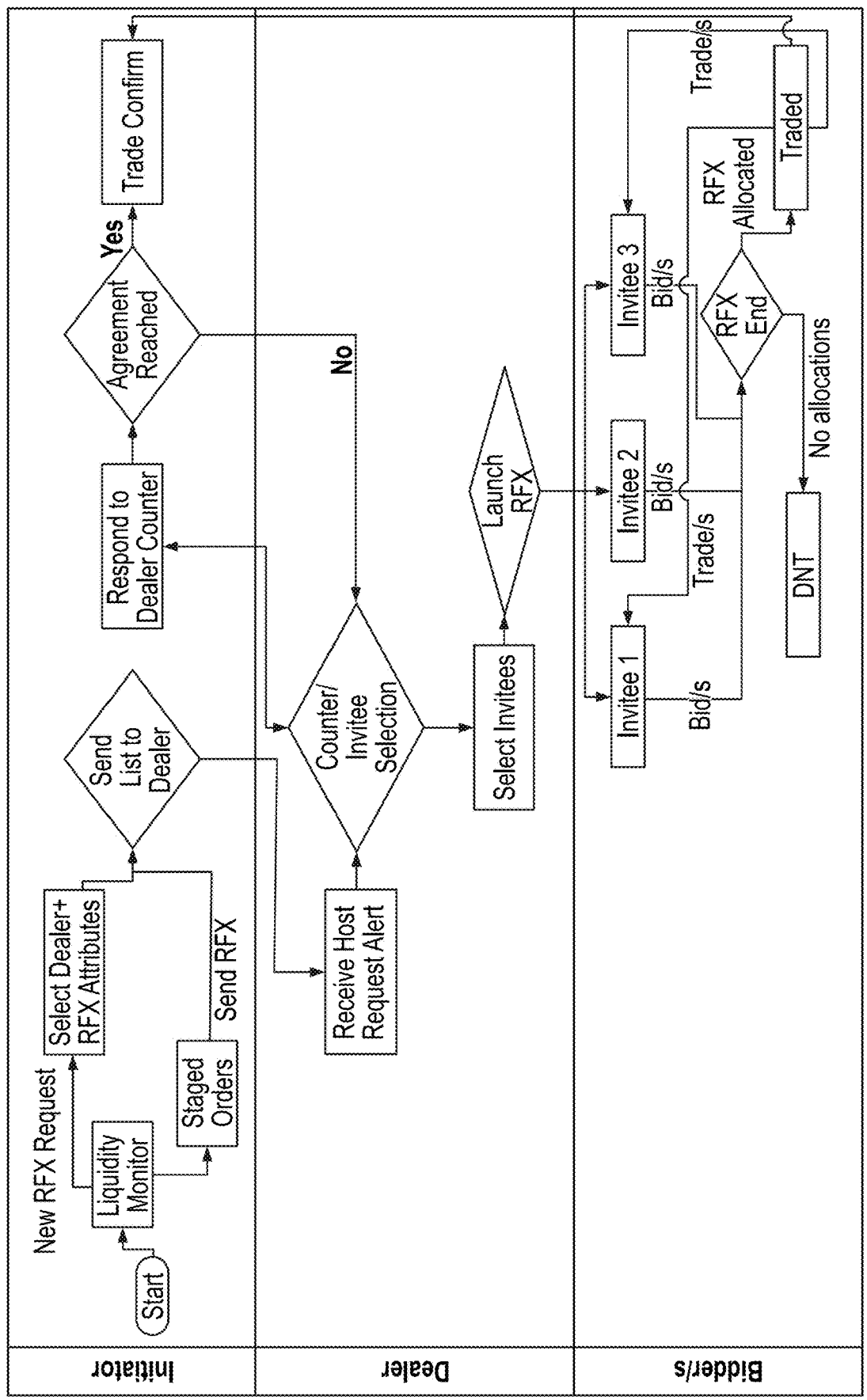

FIGS. 1A and 1B show illustrative flow charts of an exemplary workflow associated with a lifecycle of an exemplary electronic communication session having the technological improvement including the stack software object.

In some embodiments, a user may initiate an electronic communication or exchange session on the electronic execution-mediating cloud platform to initiate communication amongst parties. However, the initiating user may be initiation of the communication session to exchange sensitive information and data. Thus, the electronic execution-mediating cloud platform may employ the stack software object to ensure that access to this sensitive information is restricted to a minimum number of parties, each having a restricted ability to participate in the communication session according to participation levels instituted by the stack software object.

In some embodiments, the user may initiate the electronic communication session by selecting an intermediate entity from a pool of potential intermediate entities. The intermediate entity is selected to mediate the electronic communication session. For example, in some embodiments, an initiating user (e.g., a buy-side initiating user) may be presented with a list of the intermediate entities with whom the initiating user has the necessary agreements for participation in the electronic communication session. Thus, in some embodiments, the electronic execution-mediating cloud platform may utilize an initiating user account and the intermediate entity account of each intermediate entity in the pool to identify matching intermediate entities. Thus, the electronic execution-mediating cloud platform ensures that the intermediate entity ultimately selected by the initiating user has legal or other responsibilities to the initiating user, thus preventing leakage of information regarding the initiated electronic communication session to unaffiliated intermediate entities in the pool of potential intermediate entities.

For example, the electronic execution-mediating cloud platform may only surface intermediate entities from the pool of potential intermediate entities that have matching agreement attributes to the initiating user, such as flags or data entries representing a legal agreement to engage with each other in, e.g., financial asset trading. For example, the electronic execution-mediating cloud platform may only surface intermediate entities that have legal agreements as dealers to the initiating user to allow trading through the electronic execution-mediating platform and network.

In some embodiments, the exemplary inventive electronic execution-mediating platform of the present disclosure may be configured, via the one or more exemplary specialized GUIs of the present disclosure, to allow the initiating user to electronically select a desired intermediate entity (e.g., the single dealer). In some embodiments, the exemplary inventive electronic execution-mediating platform of the present disclosure may be configured to dynamically select for the initiating user the intermediate entity (e.g., the single dealer) to be used. In some embodiments, the exemplary inventive electronic execution-mediating platform of the present disclosure may be configured to dynamically suggest, based at least in part on one or more specialized analytical techniques (e.g., machine learning algorithms) detailed herein, to the initiating user a list of candidate intermediate entities (e.g., dealers) so that the initiating user can choose a desired intermediate entity (e.g., the single dealer) to be used.

The initiating user may select a single intermediate entity to facilitate the session, which may trigger an electronic message to be sent to the selected intermediate entity. The selected intermediate entity may receive a notification through, e.g., an electronic execution-mediating application (e.g., the request to host an electronic communication session may appear as an "alert", in a dedicated alert window, e.g., to minimize the amount of screen space used).

In some embodiments, the electronic execution-mediating application may include, e.g., a software application, including front end design and back end processing, network communication, visualization generation and a graphical user interface for interacting with the electronic execution-mediating cloud platform. In some embodiments, the electronic execution-mediating application may include, e.g., an intermediate entity selection component enabling the initiating user to select an intermediate entity from the list of potential intermediate entities surfaced by the electronic execution-mediating cloud platform. Moreover, the electronic execution-mediating application may include, e.g., an intermediate entity component that enables a selected intermediate entity to accept, deny and/or negotiate terms of the selection to mediate the electronic communication session. Additionally, the electronic execution-mediating application may include an activity monitor that enables the initiating user, the selected intermediate entity, or both to monitor activities occurring within the electronic communication session, such as, e.g., submissions, communications, transfers of information and data, etc.

In some embodiments, the electronic message to the selected intermediate entity may send the electronic communication session data, including electronic communication session attributes to the selected intermediate entity. In some embodiments, the session attributes may include parameters of a financial transaction, such as, e.g., committed level, trade now level, electronic communication session length (e.g., in time), spot instructions, among other parameters for a trade negotiation for the trade of a quantity of a position in a financial instrument, such as, e.g., a bond, a stock, or other financial instrument. In some embodiments, the "trade now level" refers to, e.g., a pre-determined price for parties to the electronic communication session to purchase position in the financial instrument, or other minimum level of response in exchange for a transfer of data. Each of the attributes defines aspects of what parties may participate in the electronic communication session and the rules concerning participation. The intermediate entity may have an interest in less strict rules to include more parties for greater confidence in, e.g., executing a trade or transfer during the session, while the initiating user may have an interest in more strict rules to prevent information leakage. Thus, the platform enables a negotiation for a balance between potential information leakage and potential mediation success. Thus, the electronic communication session may be customized in every instance.

In some embodiments, the intermediate entity, via the electronic execution-mediating application, may counter the session request to negotiate the attributes. For example, the intermediate entity may counter, e.g., to buy the subject of the transaction directly from the initiating user (e.g., buy the financial instrument such as, e.g., bonds), to negotiate the transaction spread, to negotiate the committed level, or other parameters of the transaction.

In some embodiments, the attributes may include, e.g., a backstop bid between the selected intermediate entity and the initiating user for a position in a financial instrument subject to the electronic communication session. The backstop bid is an element of the pre-trade initiation process between the intermediate entity and the client who selected him to host the electronic communication session. For example, where the initiation user is a seller that approaches an intermediate entity acting as a dealer to sell a financial instrument at a given price, the intermediate entity may commit to buy a lesser quantity of the financial instrument (e.g., a quantity of a bond below the quantity that the seller is seeking to sell) and work an order on the rest". Thus, the seller gains certainty that at least some of the seller's position in the financial instrument will be sold, while the intermediate entity's trade, e.g., once it prints on TRACE, may help other investors assess the current value of the bond. Thus, in an electronic communication session, the backstop is a commitment by the intermediate entity to step in and buy up to the amount specified at the committed level, if the full amount fails to trade. The existence or absence of a backstop bid does not impact the ability of other investors to bid whatever they choose. It may be implemented as an optional, one-time commitment from the intermediate entity to cover a portion of the trade if necessary.

In some embodiments, the exemplary inventive electronic execution-mediating platform of the present disclosure is configured, via the one or more exemplary specialized GUIs of the present disclosure, to allow the initiating user to set one or more attributes for which a particular participant or invitee to the electronic communication session would be able to see bids/offers placed during the exemplary electronic communication session by other invitees or invitees; thus, increasing transparency associated with electronic trade execution, and the likelihood of price improvement for the initiating user.

In some embodiments, the initiating user may respond to an intermediate entity counter with updated parameters. For example, the initiating user may set a new transactions spread as part of the new electronic communication session, or a new committed level or electronic communication session length, or any other parameter countered by the selected intermediate entity. However, where the counter by the selected intermediate entity includes an offer to buy the position in a financial instrument directly, the initiating user may be presented with a trade confirm option, selectable by the initiating user to conduct the trade.

In some embodiments, once the attributes are agreed upon by the initiating user and the selected intermediate entity, the initiating user may be provided with an option to instruct the intermediate entity during the electronic communication session by sending electronic communications with a "Note to Trader" option. In some embodiments, the electronic execution-mediating application may also present the initiating user with an option to cancel or withdraw from the electronic communication session prior to launch of the electronic communication session.

In some embodiments, prior to launch of the electronic communication session, the electronic execution-mediating application may provide the selected intermediate entity with, e.g., an option to select invitees from a pool of potential invitees and then launch the electronic communication session. In some embodiments, to select the invitees, the intermediate entity selects the alert/activity monitor item, the "trade ticket" appears and the customer recommendation list appears in the ticket. At this point, the intermediate entity can select/deselect invitees in the list or set filters based on the customer liquidity scores (likelihood to trade) and/or limit the total number of invitations sent out (to address information leakage). In some embodiments, once the selections are made, the intermediate entity "submits" the ticket and similar notifications are sent to the selected invitees.

In some embodiments, the selected intermediate entity may be permitted to select invitees from all electronic execution-mediating-enabled counterparties. However, where the electronic execution-mediating platform includes larger quantities of potential invitees, the electronic execution-mediating application may be configured to allow the selected intermediate entity to set defaults for, e.g., the minimum liquidity score/maximum number of potential invitees to engage in the trade. Thus, in some embodiments, the electronic execution-mediating application may utilize invitee characteristics from potential invitee accounts. In some embodiments, the invitee account characteristics may include, e.g., the invitee's name, the invitees committed level, a transfer history associated with the invitee's account, among others.

In some embodiments, the liquidity score and invitee limit fields exist on the session request. Where the intermediate entity may set defaults on these limit fields, the intermediate entity may dynamically set and modify the limit fields to dynamically filter potential invitees. In some embodiments, in addition to the machine learning invitee suggestions described above, the liquidity cloud analytics module may also track "concurrent activity" for each potential invitee, where the concurrent activity indicates that a potential invitee is unavailable to participate in the electronic communication session. In some embodiments, the capacity to trade based on availability may vary based on invitee characteristics, such as, e.g., the size of a firm. This is because larger firms may automate much of the electronic communication session trade process, allowing the large firms to handle a higher volume of requests. Smaller firms, on the other hand, may manually participate via the stack GUI and thus likely have more limited capacity to participate in concurrent electronic communication sessions.

Moreover, the intermediate entity may be provided with a list of suggested invitees of the potential invitees, e.g., based on the account characteristics associated with each potential invitee. For example, the liquidity cloud analytics module described below may predict a likelihood of each potential invitee to accept the parameters agreed upon by the initiating user and the selected intermediate entity, and to place a winning bid for the transaction. In some embodiments, the list includes the potential invitees that meet a liquidity threshold. In some embodiments, the liquidity threshold may include, e.g., a percentile threshold (e.g., the invitee must be a member of certain percentile of likelihood, such as, top 75 percentile, of the predicted likelihood of potential invitees to participate and/or win the transaction of the electronic communication session), a number of invitees threshold (e.g., a highest number of potential invitees according to predicted likelihood, such as the top 10 or 20 invitees), or a likelihood threshold include a minimum predicted likelihood score.

In some embodiments, the initiating user may monitor the electronic communication session via the activity monitor and take steps to improve chances of execution. For example, the initiating user may, e.g., add more invitees, edit committed level (for unlocked/open stacks), extend electronic communication session length, or modify other attributes to improve the likelihood of the execution of a trade. In some embodiments, the activity monitor may provide a live or real-time update to the activity monitor for the initiating user to monitor the state of the electronic communication session. For example, the initiating user may monitor the bids and choose to trade early or receive trade confirmation if electronic communication exchanges are executed according to the attributes.

In some embodiments, the set of session invitees selected by the intermediate entity may be presented with the activity monitory according to the attributes of the electronic communication session agreed upon by the initiating user and the intermediate entity. In some embodiments, the attributes may define settings of the stack software object that establish participation levels of selected invitees. In some embodiments, the participation levels affect the user computing devices and the electronic execution-mediating cloud platform to restrict types of activities that the parties to the electronic communication session may engage in and view, e.g., via a stack graphical user interface (GUI). In some embodiments, the permissions of each session invitee to access communications during the electronic communication session, such as, e.g., an open, locked or unlocked permissions level of the stack GUI, as described above.

In some embodiments, the exemplary inventive electronic execution-mediating platform of the present disclosure is configured to allow each initiating user to set one or more attributes to establish the settings of the stack software object that controls the scope of what invitees could see at the stack GUI during an electronic communication session. For example, once the electronic communication dealer has invited a select number of invitees, the electronic communication dealer's invitees and, optionally, the liquidity database's invitees are able to place bids or offers, depending on the direction of the particular electronic communication session, for the selected corporate bond. For example, in some embodiments, invitees to the electronic communication session are able to see certain information at the stack GUI based, at least in part, on whether the stack software object setting for the electronic communication session is "locked", "unlocked," or "open". For example, in some embodiments, the initiating user and the electronic communication dealer can also see some or all information being posted to the stack GUI. For example, in some embodiments, all invitees are able to bid/offer or improve the level of their bid/offer for the selected corporate bond for the duration of the electronic communication session. For example, in some embodiments, responding with price levels is a competitive process for the duration of the electronic communication session and will be determined by price, then size, then time, unless the electronic communication session is fully allocated, at which point the submissions shown by the stack GUI will be ordered by price, then time.

In some embodiments, when the stack GUI is locked the stack GUI or invitees' submissions during the electronic communication session are visible only to those invitees that have placed a bid having certain predetermined parameter(s) (e.g., submissions at the committed level or better).

In some embodiments, when the stack GUI is unlocked the stack GUI or invitees' submissions during the electronic communication session are only visible to those invitees that have placed a bid (e.g., submissions at any level). For "unlocked" stacks, the initiating user specifies predetermined parameters including, e.g., an indicative price (not firm). As with locked stacks, invitees need to submit levels at or better than the reserve level to gain access to the stack. The difference is that the initiating user has an option, not a firm commitment, to trade at the reserve level.

In some embodiments, when the stack GUI is Open: the stack GUI or invitees' submissions during the electronic communication session are visible to all invitees.

In some embodiments, the stack type options help an initiating user/trader manage the trade-off for the amount of information they need to share with counterparties to create a robust bidding environment.

For example, in any given month, less than, e.g., 20% of all US corporate bonds have at least 1 trade every business day. This episodic nature of trading makes it difficult for investors to calibrate the current price of a specific bond to the dynamic conditions in the market. In some embodiments, the electronic execution-mediating platform employs the locked, unlocked and open stack software object participation levels to give trade initiating users tools to help them tailor the trading process across a range of market conditions.

In some embodiments, for liquid bonds from popular issuers, locked stacks are generally the most appropriate option. The locked stack participation level forces invitees to commit some degree of risk in order to see the prices submitted by those with whom they would be competing to trade the bond.

In some embodiments, an unlocked stack gives the initiating user the option to set a secondary level which if met by the bidders allows them to see the bids entered by others. The bidders' levels are treated as "firm" (i.e., must be honored), while the initiating user retains an option to proceed or walk away from the trade. The unlocked stack participation level lets potential counterparties interact in a manner that can get a conversation started.

The open stack participation level creates a forum for price discovery for "hard to trade" assets.

In some embodiments, session invitees are then able to submit their trade parameters (size and level) and view the "stack", which provides transparency into the activity of all participants. However, based on the participation levels, the session invitees may or may not be able to see identifiers (e.g., names) associated with each other session invitee participating in the electronic communication session. For example, a locked stack GUI may anonymize each session invitee in the electronic communication session.

In some embodiments, the session invitees may also be presented with the option to submit one or more bids via the stack GUI. In some embodiments, a matching engine that processes inputs to an order book anonymizes the names of the participants in the electronic communication session. The system also maintains the anonymized name mapped to each participant. As the subscription manager routes updates about the order book to the stack GUI, it converts the anonymized name to the "My Bid" for display to the user. In some embodiments, communications to the electronic communication session may be routed via the FIX standards and converted in a similar fashion.

For example, in some embodiments, the electronic communication system employs the "liquidity cloud", e.g., the computing cloud 1705 of FIG. 17 described below. In order to participate in the liquidity cloud, one must be an intermediate entity on the platform or a client of at least one intermediate entity. The liquidity cloud allows participants to share their current interest with the electronic execution-mediating platform so that they have an ability to participate in trades, should the opportunity present itself. Information leakage leads to a reluctance among market participants to advertise their intentions. Thus, the liquidity cloud collects these intentions by electronic communication session system, with the understanding that should the "other side of the trade" emerge, the electronic communication session system has the ability to reach liquidity throughout its entire network.

In some embodiments, the stack software object controlling the electronic communication session system implements the rules that control access to content for all participants based upon their role in the trade. The initiating user only selects the intermediate entity. We have plans to allow initiating users to communicate white list/black list rosters of other account managers that the initiating user wants to allow/block from invitation to the electronic communication session. This would be allowed as a further means for controlling information leakage. It may be obvious to market participants that if a given bond is being sold in a large size that, it is likely that, e.g., a top 10 asset manager is the seller, which may spook the market.

In some embodiments, the attributes may only allow multiple bids, which may be scaled or independent, and bids, once placed, to only be allowed to improve on past bids. In some embodiments, the stack software object controlling the electronic communication session may enable a bidder to specify a minimum bid fill amount. In some embodiment, the electronic execution-mediating application may only allow for bids that can be canceled by an intermediate entity. Moreover, if the bid is allocated, the bidder may be presented with a trade confirm at the end of the electronic communication session. However, if a bidder is outbid, the bidder may be presented with an alert. Furthermore, in some embodiments, a reset period may be established where a new bid that impacts existing allocations may trigger the reset period to facilitate resetting the allocations.

In some embodiments, the stack software object may enable the invitees to have the option to remain anonymous until the electronic communication session is completed and ready for booking (if the invitee bids but is not part of the final trade allocation, the intermediate entity will not know they were bidding). In some embodiments, if no agreement exists between a winning bidder from the liquidity cloud and the host intermediate entity, a "step-in intermediate entity" is assigned to settle the trade. Again, the invitee is in a position to participate at all because the invitee has a connection to at least one intermediate entity.

In some embodiments, the one or more exemplary specialized GUIs of the present disclosure may be configured to allow users to engage in the exemplary inventive electronic communication process by allowing a seller or buyer of corporate bonds to send an electronic request that would request, via a computer system, an intermediate party (e.g., a dealer) to host one or more competitive electronic executions via the electronic communication session (one or more particular electronic communication for one or more particular financial instrument such as corporate bond). For example, the exemplary inventive electronic execution-mediating platform of the present disclosure is configured to allow a single intermediate entity (e.g., a single dealer) to execute the exemplary electronic communication bidding on behalf of a seller or a buyer by electronically offering, via specialized electronic communication messaging, to a plurality of potential invitees an opportunity to fulfil the initiating user's submission based on one or more suitable matching condition(s) whose illustrative examples are provided herein.

In some embodiments, the exemplary inventive electronic execution-mediating platform of the present disclosure is configured to rank potential counterparties by their anticipated level of interest in a transaction. This empowers those sending out these communications to limit "information leakage", thereby preventing providing an adversary with information that can be used against a party (e.g., the initiating user or the invitees).

In some embodiments, the exemplary inventive electronic execution-mediating platform of the present disclosure is configured to allow the intermediate entity to electronically select invitees to whom electronic invitation may be electronically transmitted. In some embodiments, the exemplary inventive electronic execution-mediating platform of the present disclosure is configured to suggest, based at least in part on one or more specialized analytical techniques (e.g., machine learning algorithms) detailed herein, to the intermediate entity (e.g., the single dealer) a list of clients of such intermediate entity (i.e., potential invitees) who would be most likely to be interested in selling/buying one or more specific financial instruments (e.g., specific corporate bond(s)) that would be part of the exemplary sell or buy offer; consequently, allowing to electronically aggregate (and potentially increase) liquidity across multiple invitees.

In some embodiments, the exemplary inventive electronic execution-mediating platform of the present disclosure is configured to require, via the one or more exemplary specialized GUIs of the present disclosure, an initiating user to submit a firm buy/sell order having a minimum price that, if met, the initiating user will commit to buy or sell the specified financial instrument (e.g., corporate bond), depending on the direction of the exemplary inventive electronic communication. In some embodiments, the exemplary inventive electronic execution-mediating platform of the present disclosure is configured to require, via the one or more exemplary specialized GUIs of the present disclosure, not only a certain price but also certain size/quantity (e.g., a minimum size/quantity). In some embodiments, the exemplary inventive electronic execution-mediating platform of the present disclosure may be configured to vary value(s) for the required price, the required quantity, or both, based at least in part on one or more of a type of financial instrument, issuer of financial instrument (e.g., corporate bond), characteristic(s) of initiating user (e.g., historical transactional data), characteristic(s) of the selected intermediate entity (e.g., the single dealer), etc.

The matching engine that processes inputs to the order book anonymizes the names of the participants in the trade. The system also maintains the anonymized name mapped to each participant. As the subscription manager routes updates about the order book to the UI, it converts the anonymized name to the "My Bid" for display to the user. In some embodiments, a similar conversion is made for messages routed via FIX. In some embodiments, the dealer sees explicit names for all participants because each is a client of the dealer. However, the participants are prevented from viewing the names of other participants to prevent information leakage. In some embodiments, the anonymized names are randomly chosen for each transaction. As a result, a buyer might be "bidder 1" on one trade and "bidder 89" on the next one.

In some embodiments, the exemplary inventive electronic execution-mediating platform of the present disclosure is configured to utilize one or more suitable specialized analytical techniques (e.g., machine learning algorithms), as detailed herein, to identify most likely invitees to participate in the electronic communication session. For example, electronic execution-mediating platform may employ a cloud-based analytics module that identifies the most likely invitees of the pool of potential invites to transact with a particular financial instrument (e.g., corporate bond) based at least in part on continuously updatable database(s) (liquidity database(s)) which electronically aggregate(s), for example, without limitation, one or more of transactional data various market participants, their pre-trade intentions, and characteristic(s) of their desired counterparty(ies). In some embodiments, the exemplary inventive electronic execution-mediating platform of the present disclosure is configured to operate as a membership network of users who may be invited to participate in a particular electronic communication session based on their pre-trade intention and/or estimated trade likelihood even when they are not associated with the particular intermediate entity (e.g., the single dealer); thus providing additional source of liquidity for the inventive electronic execution of the present disclosure. In some embodiments, the exemplary inventive electronic execution-mediating platform of the present disclosure is configured to utilize one or more suitable specialized analytical techniques (e.g., machine learning algorithms), as detailed herein, to determine a liquidity score for a particular financial instrument (e.g., corporate bond) (a quantitative representation of a likelihood to find a successful matching) based at least in part on, without limitation, users' pre-trade intentions and/or their estimated trade likelihood.

In some embodiments, the exemplary liquidity cloud's analytics module may be configured to generate/utilize separate prediction models for each intermediate entity and/or financial instrument (e.g., corporate bond) based on one or more machine learning techniques (such as, but not limited to, decision trees, boosting, support-vector machines, neural networks, nearest neighbor algorithms, Naive Bayes, bagging, random forests, etc.). In some embodiments and, optionally, in combination of any embodiment described above or below, an exemplary neural network technique may be one of, without limitation, feed-forward neural network, radial basis function network, recurrent neural network, convolutional network (e.g., U-net) or other suitable networks. In some embodiments and, optionally, in combination of any embodiment described above or below, an exemplary implementation of Neural Network may be executed as follows:

1) define Neural Network architecture/model,
2) transfer the input data to the exemplary neural network model,
3) train the exemplary model incrementally,
4) determine the accuracy for a specific number of timesteps,
5) apply the exemplary trained model to process the newly-received input data,
6) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node likely to be activated.

In some embodiments and, optionally, in combination of any embodiment described above or below, an exemplary connection data for each connection in the exemplary neural network may include at least one of a node pair or a connection weight. For example, if the exemplary neural network includes a connection from node N1 to node N2, then the exemplary connection data for that connection may include the node pair <N1, N2>. In some embodiments and, optionally, in combination of any embodiment described above or below, the connection weight may be a numerical quantity that influences if and/or how the output of N1 is modified before being input at N2. In the example of a recurrent network, a node may have a connection to itself (e.g., the connection data may include the node pair <N1, N1>).

In some embodiments and, optionally, in combination of any embodiment described above or below, the exemplary trained neural network model may also include a species identifier (ID) and fitness data. For example, each species ID may indicate which of a plurality of species (e.g., intermediate entities', initiating users', invitees' and/or corporate bonds' categories) a particular model is classified in. For example, the fitness data may indicate how well the exemplary trained neural network model models the input data set. For example, the fitness data may include a fitness value that is determined based on evaluating the fitness function with respect to the model. For example, the exemplary fitness function may be an objective function that is based on a frequency and/or magnitude of errors produced by testing the exemplary trained neural network model on the input data set. As a simple example, assume the input data set includes ten rows, that the input data set includes two columns denoted A and B, and that the exemplary trained neural network model outputs a predicted value of B given an input value of A. In this example, testing the exemplary trained neural network model may include inputting each of the ten values of A from the input data set, comparing the predicted values of B to the corresponding actual values of B from the input data set, and determining if and/or by how much the two predicted and actual values of B differ. To illustrate, if a particular neural network correctly predicted the value of B for nine of the ten rows, then the exemplary fitness function may assign the corresponding model a fitness value of 9/10=0.9. It is to be understood that the previous example is for illustration only and is not to be considered limiting. In some embodiments, the exemplary fitness function may be based on factors unrelated to error frequency or error rate, such as number of input nodes, node layers, hidden layers, connections, computational complexity, etc.

For example, a particular predictive model can be created by following at least the 3-step process of:
1) Data Extraction,
2) Data Enrichment, and
3) Modelling.

Data Extraction

In some embodiments, the data used in the model comes from a combination of information from private (non-public data of a particular user (e.g., intermediate entity)) and public electronic sources, and may include one or more chosen from:
1) Transaction Data (e.g., the post-trade settlement process data), having at least one or more of the following parameters:
   a) Trade Time (dd/mm/yyyy hh:mm:ss)
   b) CUSIP
   c) Customer Account #
   d) Trade Amount
   e) Trade Price
   f) Direction (buy/sell)
2) Security/financial instrument (e.g., corporate bond) Master Data (e.g., structural and descriptive attributes are collected for each bond; for example, some of these attributes are used as direct model inputs; and others are used to generate expected performance and risk metrics that help the model calibrate the interactions between clients and tradable bonds), having at least one or more of the following parameters/fields:
   a) Maturity Date,
   b) Coupon Type,
   c) Coupon Rate,
   d) Coupon Payment Frequency,
   e) Day-count type,
   f) Call Schedule (if applicable),
   g) Put Schedule (if applicable),
   h) Floating Rate Coupon Formula (if applicable),
   i) Principal Redemption Schedule (if applicable),
   j) Issuer Name,
   k) Industry/Sector (multiple levels),
   l) Amount Outstanding,
   m) Original Issue Amount,
   n) Investment Grade/High Yield Flag,
   o) Credit Ratings,
   p) Spread data (e.g., to assess the market's view on the credit risk of an asset versus credit ratings),
   q) TRACE-eligibility flag,
      i) Supplied by FINRA to identify bonds whose transactions must be reported to the regulator.
3) Price Data (e.g., a minimum of 3 months history may be required to build/train each dealer's model; for example, the price history repository covers all TRACE-eligible bonds and the benchmark US Treasury notes/bonds that are a reference point for market participants), having at least one or more of the following parameters:
   a) Daily closing prices are collected for each bond,
   b) Intraday US Treasury prices are collected for each of the following benchmark maturities:
      i) 2-year, 3-yr, 5-yr, 7-yr, 10-yr, 30-yr,
   c) A LIBOR model is used to derive the benchmark levels for bonds with less than 13 months to maturity,
   d) Trade-by-trade data from FINRA TRACE.

In some embodiments, the exemplary inventive analytics module may utilize trader/salesperson identifier(s) in the trading data to segment larger asset managers into several distinct recommendation targets, based upon their sales coverage. For example, salesperson A may cover asset manager B for investment grade bonds but salesperson B may have the relationship for high yield.

In some embodiments, the exemplary inventive analytics module may utilize the account number to identify "block accounts", which are used for the initial booking of a trade and "real accounts" that hold assets for investors. Then, the exemplary inventive analytics module may identify groups of "real accounts" that share similar asset selection and trading tendencies, allowing to break down larger clients into more granular segments. For example, groups of real accounts can be identified based on, e.g., "passive investors" that seek to match the performance of an index, and "active investors" look to beat the index. The bonds passive investors and active investors trade and the timing of these trades have distinctive patterns according to the type of investor.

Data Enrichment

In some embodiments, the Data Enrichment step may involve a process of Trade Aggregation, performed by the liquidity cloud's analytics module. In some embodiments, the Trade Aggregation process is a component of our historical Data Enrichment, where, e.g., analytics module extracts raw data from settlement systems and matches the trades to market events reported in FINRA's TRACE system. The liquidity cloud provides a view of current market information, contributed by user firms (both buy-side & dealers). For example, since the post-trade data may include both the original block trade and records for the final allocations to the beneficial owners of the securities, the exemplary inventive analytics module may generate a prediction model that would focus on decision maker(s) in each trade (e.g., the block trade counterparty). For example, using a combination of the dealer transaction data and the FINRA TRACE data, the exemplary inventive analytics module may match the transactions from each dealer's records to the specific transaction in TRACE. For example, in cases where multiple transactions in the dealer records match a single TRACE trade, the exemplary inventive analytics module may first look for a record that exactly matches the trade size reported to FINRA. If such a trade is found, the exemplary inventive analytics module may associate the counterparty in that record as the executing counterparty. Furthermore, for example, the exemplary inventive analytics module may create a parent/child relationship between the executing counterparty and the other accounts that were associated with the trade.

In some embodiments, trade aggregation in the data enrichment step may include, e.g., three data aggregation/normalization steps. In some embodiments, a first step includes block trade aggregation from the transaction history files. The analytics module may create predictions that look to identify the entity that acted in the market to execute a trade. Institutional money managers may often trade on behalf of their clients or, in the case of mutual funds, the legal entity responsible for the fund. Moreover, a single trade in the market is often allocated to multiple accounts at the direction of the asset manager. As a result, the raw transaction records list the beneficial owner (buyer/seller) of the traded asset and may also contain a record reflecting the block trade recorded prior to the allocations. In some embodiments, the analytics module employs the main characteristics of the trades extracted from the dealer records and reconcile these trades to transactions reported in FINRA's TRACE feed. Matching is based upon exact matches on CUSIP, execution time, trade direction, price and counterparty type. In some embodiments, the analytics module may also look to match on total trade size, although this is not always possible due to FINRA's policy to cap the actual transaction amount reported for trades larger than $5 MM for investment grade bonds and $1 MM for high yield bonds.

At times, an asset manager executes a trade with a dealer on behalf of a single client. When this occurs, the asset manager's name may not appear in the trade record captured from the dealer. Instead, the record contains just the name of the beneficial owner. Accordingly, in some embodiments, a second step of trade aggregation may include mapping all the beneficial owner accounts to the corresponding asset manager (a candidate for inclusion in our recommendation model, by virtue of their trade decision making authority). This process employs, e.g., an iterative analysis of the counterparties reported by the dealer where the rate of co-occurrence among the counterparties identified in transactions with multiple reported participants is measured. In some embodiments, the block account (i.e., the decision-making counterparty) is the most frequently observed trade counterparty.

Finally, the trade aggregation employs a number of natural language processing (NLP) techniques to cleanse the dealer counterparty data. In some embodiments, the raw information comes from content sets that have grown organically, sometimes over decades. Account names are created by administrators at each client and there appear to be no validation rules to enforce standardization. (This is name/address data, that are not critical to the trade processing performed by Broadridge). In some embodiments, the analytics module may employ an official source for Tax ID's as the target name for each entity in our process and use NLP pattern matching to associate the text strings found in our sources to the appropriate firm. As more dealers and buy-side clients are onboarded to the platform, the analytics module is able to capture this information directly from the dealers. In some embodiments, this mapping to Tax IDs allows identification of asset managers across the full spectrum of dealers on the platform.

In some embodiments, the first and second trade aggregation steps may be executed daily as new trade records are added in, e.g., a nightly model training process. Thus, the client mappings may be refined as new names and relationships are uncovered. However, other periods may be employed, such as, e.g., weekly or monthly updates, or in some embodiments, a continuous update or live update process may be used.

In some embodiments, during the Data Enrichment step, for each record in the dealer transaction table, the TRACE transaction table and the end-of-day price history table, the exemplary inventive analytics module may compute the following values:
1) Yield-to-worst (YTW) (e.g., Yield to the issuer's next logical redemption date),
2) Option-adjusted Spread (OAS),
3) Option-adjusted Duration,
4) Option-adjusted Convexity,
5) Spread to Benchmark Treasury.

In some embodiments, during the Data Enrichment step, the exemplary inventive analytics module may apply time series analysis to determine Baseline Liquidity Metric (liquidity score) based at least in part upon the relative trade volume and trade count for each bond over the most recent 3-months of trading. In some embodiments, the Baseline Liquidity Metric is generated based on factors such as, e.g., the activity of the bond observable through TRACE. In some embodiments, for dealers, this is adjusted to account for his recent activity, as a percentage of TRACE activity overall and in the specific bond being analysed, and for clients, the adjustment is derived from the output of the neural network, which projects the client's expected level of interest in a particular trade opportunity. In some embodiments, Baseline Liquidity Metrics are a function of the desired trade price and the size of the trade. The user has no way to influence how this 3-dimensional surface is constructed, other than by executing trades. In some embodiments, however, a user may modify the price and/or size of a trade, and the analytics module may return the score for the corresponding point on this surface.

In some embodiments, during the Data Enrichment step, the exemplary inventive analytics module may utilize Price/Yield volatility, by using the end-of-day prices for each bond, to compute, for example, without limitation, 1-mo, 3-mo & 6-mo historical volatility for both the price and yield. For example, in some embodiments, such metrics may provide insight into the relative performance risk for bonds with similar structural characteristics. In some embodiments, during the Data Enrichment step, the exemplary inventive analytics module may utilize Total Return metrics, using end-of-day prices for each bond, compute 1-mo, 3-mo & 6-mo realized returns for a unit investment. For example, these metrics present the models with critical performance attributes for the assessing users' trading preferences.

Modelling

In some embodiments, during the Modelling step, the exemplary inventive analytics module may employ an ensemble modelling approach. For example, in some embodiments, the exemplary inventive analytics module may employ a Natural Language Processing to clean and normalize the set of eligible trading counterparties. For example, in some embodiments, the exemplary inventive analytics module may employ K-means clustering to create candidate groupings of "comparable bonds". For example, in some embodiments, the exemplary inventive analytics module may utilize results of these models as inputs to an exemplary neural network model (e.g., FIG. 2) that would be trained to create an exemplary prediction model.

In some embodiments, cleansing and normalizing the set of eligible trading counterparties ensures that the characteristics of past trading behaviours being quantified reflect the actual participants in the market to provide value to the predictions in guiding future trades.

In some embodiments, K-means clustering is employed by the analytics module due to greater interpretability. For example, the cluster members may be exposed in a GUI visualization, e.g., by depicting the clustering. However, other classification and clustering models may be used, including, e.g., random forest, k-nearest neighbours, portioning, etc.

For example, in some embodiments, the exemplary inventive analytics module may generate a user-related Master table/dataset/database. For example, the block-trade accounts identified in the trade aggregation process above may be mapped to a normalized account name using information collected from the dealer's customer table. For example, in some embodiments, the exemplary inventive analytics module may use a combination of natural language processing and clustering technique(s) to automate the creation of these mappings.

In some embodiments, for example, large asset managers manage funds using a variety of investment strategies. Some funds employ passive strategies, aiming to match the performance of some market benchmark index. Other funds employ active strategies that seek to beat the performance of these indices. In the end, invitations to participate in an electronic communication are delivered to human traders, who manage the accounts that have passive or active performance goals. Treating these large firms as single entities is likely to distort the signals we are able to detect. At one extreme, an active manager's interest in bonds with premium prices may be negated by an equally large passive fund manager who only trades bonds that trade at a discount to par.

From a modelling perspective, the biggest challenge is to create the partitioning of the accounts into the sub groups. The modelling process is not sensitive to the number of potential counterparties, provided there is sufficient data to adequately model each group.

For example, in some embodiments, the exemplary inventive analytics module may determine a Bond Similarity. For example, the exemplary inventive analytics module may employ a K-means clustering model to establish groupings based mainly on security master attributes. For example, each bond's assigned cluster number becomes an input feature for the exemplary neural network of FIG. 2.

Figure 2:
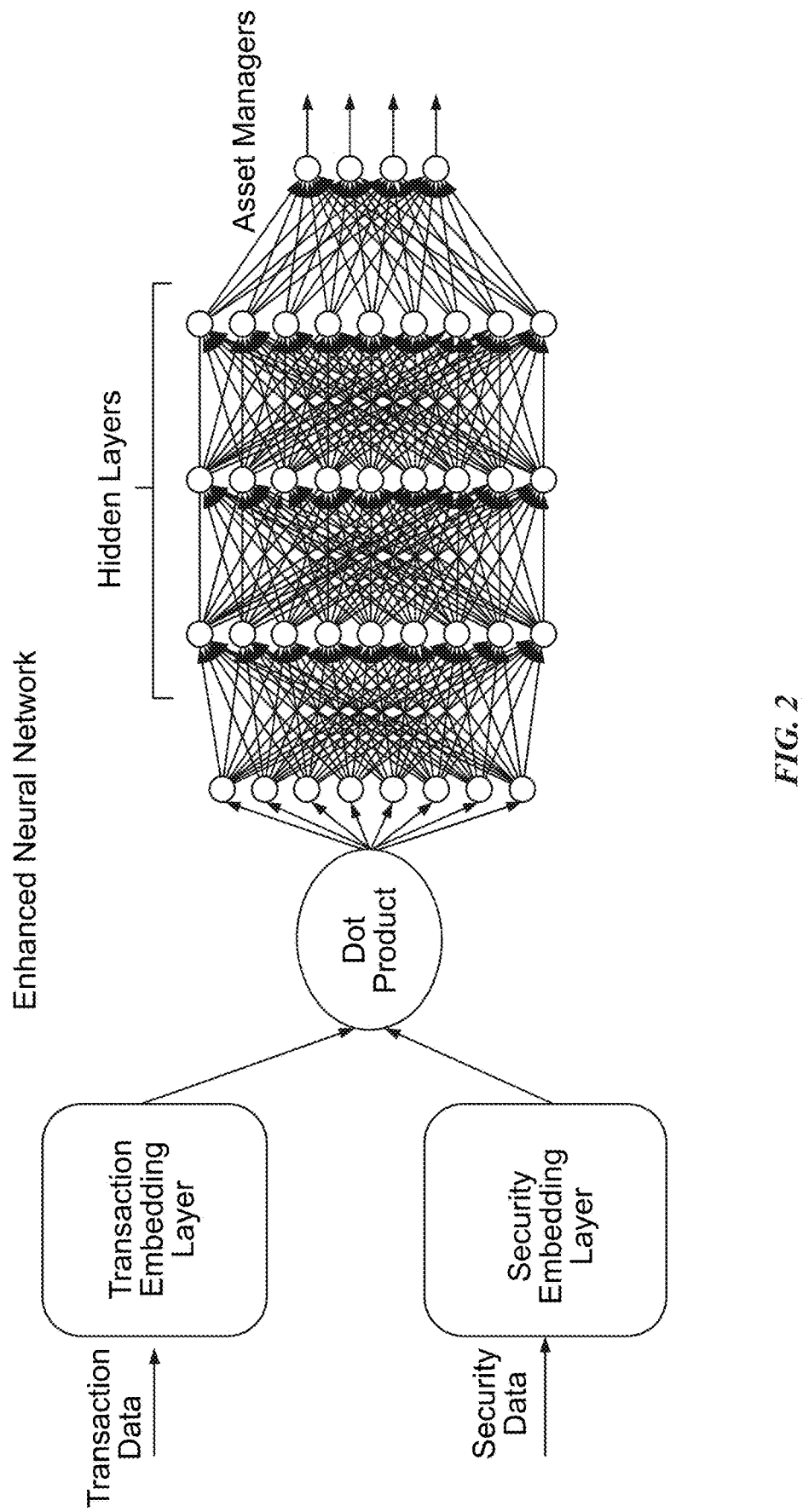

For example, in some embodiments, as shown in FIG. 2, the exemplary inventive analytics module may input a set of transaction data and security information, for example, collected over a minimum of 3 months, as input to the exemplary neural network. For example, such inputs would represent known information that resulted in trades with specific counterparties. For example, in some embodiments, the exemplary inventive analytics module may utilize the exemplary neural network to fit a series of weights that produce a solution that maximizes the number of instances where the input from trade X identifies the actual buyer in that trade.

For example, in some embodiments, the number of hidden layers depends on the non-linear complexity of particular relationship(s) to be discovered by the model. For example, in some embodiments, each hidden layer may have no more than ⅔ the number of nodes in the input layer. For example, in some embodiments, the exemplary inventive analytics module may utilize a "SoftMax" function (e.g., function that takes as input a vector of K real numbers, and normalizes it into a probability distribution consisting of K probabilities) as the "activation function" applied at each node to control the transfer of information through the network and to reach the output layer. For example, the model would assign the probability that each counterparty would be the buyer for the trade described by a particular input sample.

For example, in some embodiments, the exemplary inventive analytics module may utilize "Default_indicator" as a flag that indicates if a bond has failed to meet its interest and or principal payment obligations and to help refine the categorization of securities for both the bond similarity and the neural network model generation/validation.

In some embodiments, an exemplary generated predictive model can be tested by utilizing market data as input data. For example, counterparties in the output layer may be sorted by their probability of execution (e.g., the value of the "SoftMax" activation function). For example, a positive outcome is defined as cases where the observed by was:
1) Present in the Top 10 most likely buyers, Or,
2) one of the Top 10 buyers bought the bond in the trade or a substantially similar bond in the next 24 hours.

In some embodiments, the "substantially similar" test may be defined as a bond from the same cluster, using the K-means clustering model based on bond attributes.

In some embodiments, the output layer of the neural network assigns a value ranging from 0 to 1 to each candidate counterparty (names on a dealer's client list) (CACi) that can be interpreted as the probability that the counterparty will execute a trade with the specified attributes. The ranking is achieved by ordering the customers by this metric.

In some embodiments, the metric above may be combined with the market-level liquidity score derived from TRACE using the following formula: $LS_i = Min(LS_{market} + 10*(CAC_i/2), 10)$ and presented to a user. For example, for bond X, $LS_{market} = 7$ and $CAC_i = 0.367$. Thus, $LS_i = Min(7 + 3.67/2, 10) = 8.84$, which may be rounded to 9.

In some embodiments, the above described formula is calibrated to actual market outcomes using the data from the actual electronic communication process, e.g., through nightly, weekly, monthly, or real-time updating and training.

In some embodiments, facilitate the ability by an initiating user to access needed liquidity from more "natural" counterparties that an intermediate entity may select as invitees to a given electronic communication session. This, once again, reduces information leakage to potential adversaries in the market. In some embodiments, intermediate entities benefit from being able to provide better service to both the initiating user, who is triggering the event and to the invitees who are asked to participate in the session. Intermediate entities struggle to provide adequate coverage to clients in the "long tail" of the customer list. The recommendations help highlight productive opportunities to engage these clients as invitees to electronic communication sessions. In some embodiments, invitees may benefit similar to the intermediate entities because the invitees are more often contacted for opportunities that matter to them, instead of calls meant to "keep them warm".

FIG. 3 shows exemplary inputs into the exemplary inventive neural network of the present disclosure (e.g., FIG. 2).

Figure 4:
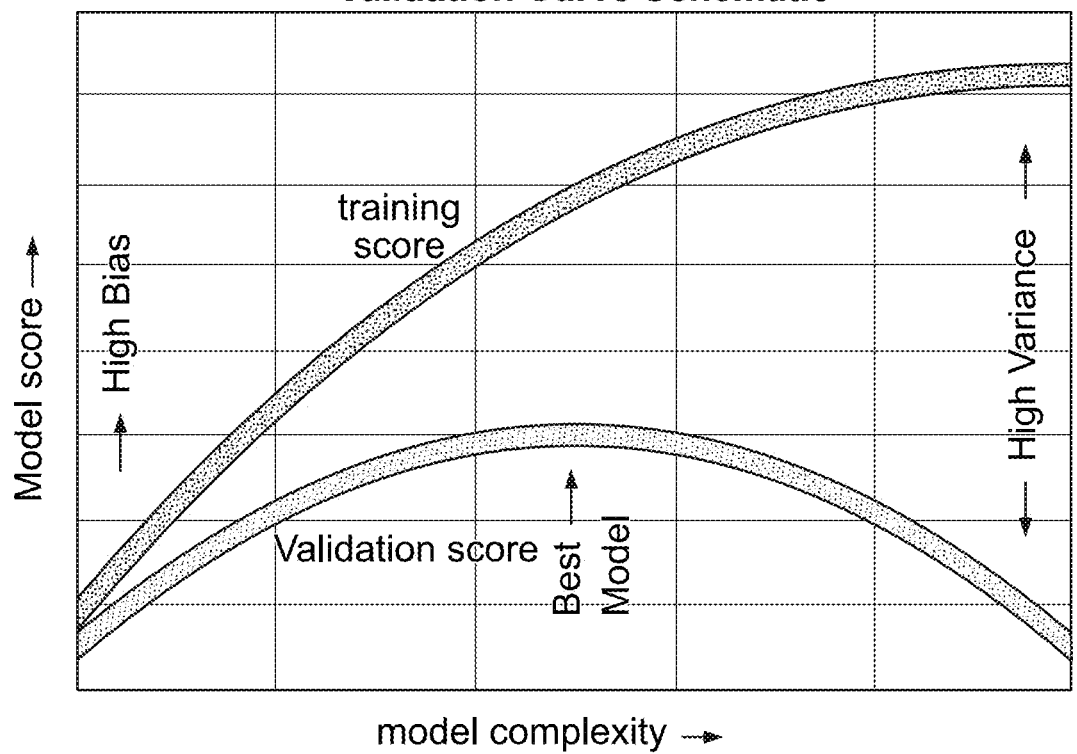

FIG. 4 shows exemplary testing of exemplary predictive models based on training and validation scores to determine when an optimal predictive model to be used by the exemplary inventive analytics module may for various analytics detailed herein.

Figure 5A:
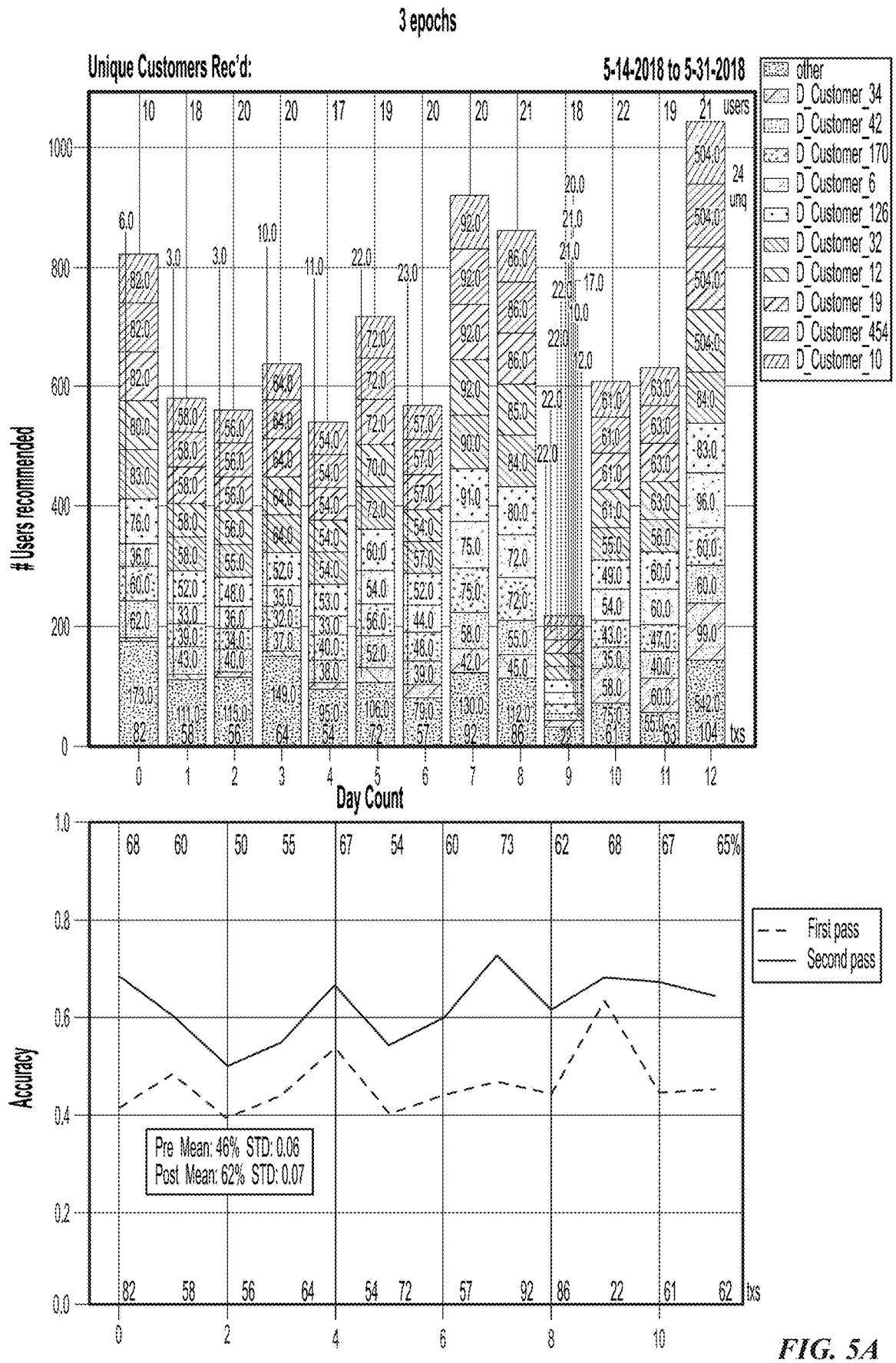
Figure 5B:
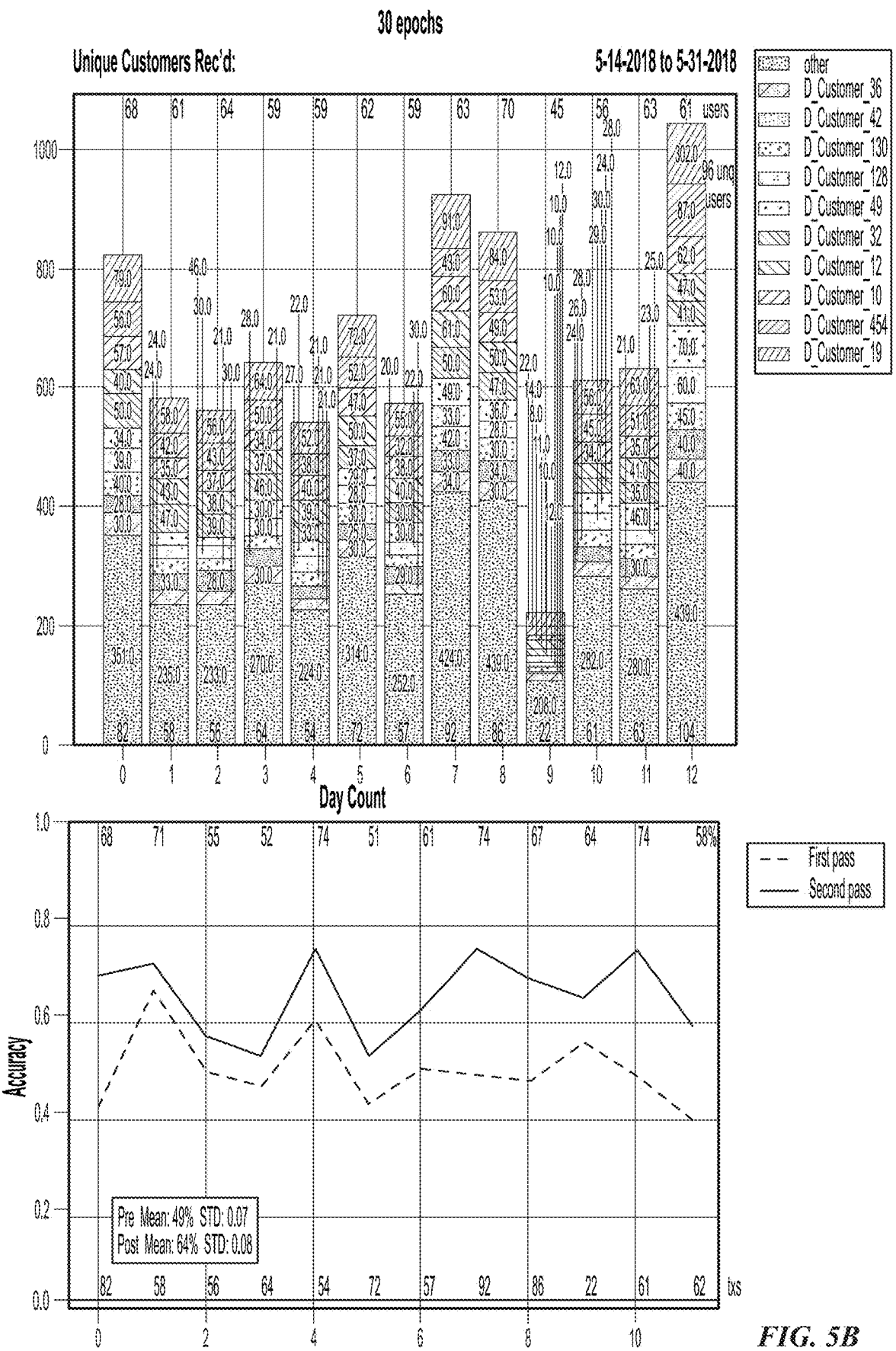
Figure 5C:
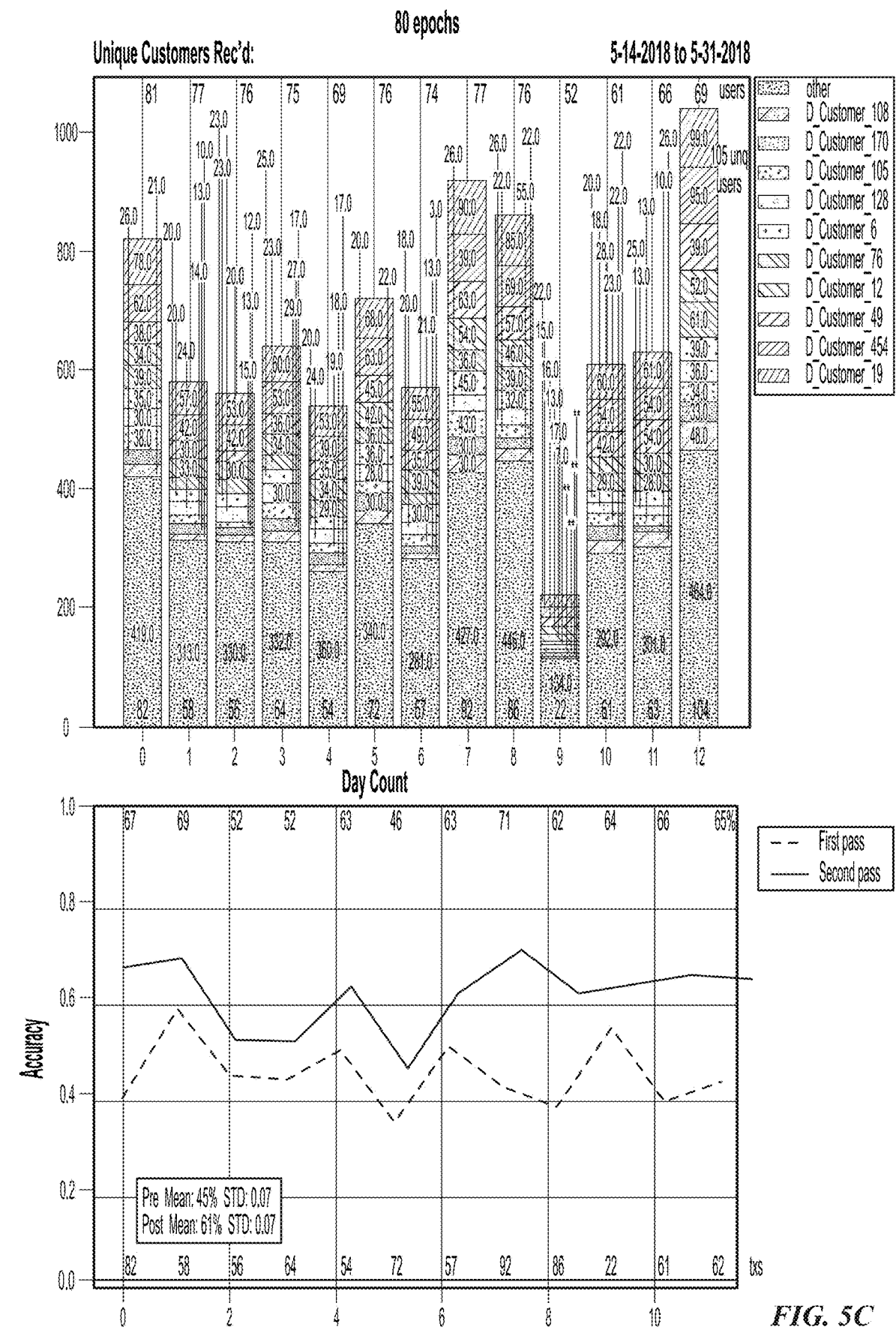

FIGS. 5A-5C shows exemplary statistics utilized for training exemplary predictive models.

FIG. 6 is a screenshot of an exemplary inventive specialized GUI of the present disclosure in a form of a dashboard showing a state of the exemplary inventive liquidity cloud at a particular time.

FIG. 7 is a screenshot of an exemplary inventive specialized GUI of the present disclosure in a form of a dashboard showing pre-trade intentions of a particular user (e.g., initiating user) of the exemplary inventive electronic execution-mediating platform of the present disclosure in the exemplary inventive liquidity cloud at a particular time.

FIG. 8 is a screenshot of the exemplary inventive specialized GUI of FIG. 7 with a pop-up inventive specialized GUI showing historical data regarding a particular liquidity score.

FIG. 9 is a screenshot of an exemplary inventive specialized GUI of the present disclosure that a particular initiating user can use to set-up parameters of a desired electronic communication session (e.g., target dealer(s), buy/sell indicator, corporate bond, amount, price, etc.).

FIG. 10 is a screenshot of an exemplary inventive specialized GUI of the present disclosure that a particular dealer can use to track requests to host electronic communication session(s).

FIG. 11 is a screenshot of an exemplary inventive specialized GUI of the present disclosure that a particular invitee can use to make submission(s) into a particular electronic communication session.

FIGS. 12-16 are screenshots of various states of exemplary inventive specialized stack GUIs of the present disclosure that are presented to the initiating user (Seller), the electronic communication dealer, and an invitee during a particular electronic communication session. As FIGS. 12-16 illustrate, for example, invitee's ability to perform certain activities and view certain information may be limited based on parameters of the electronic communication session (e.g., Locked, Open, etc.).

Figure 17:
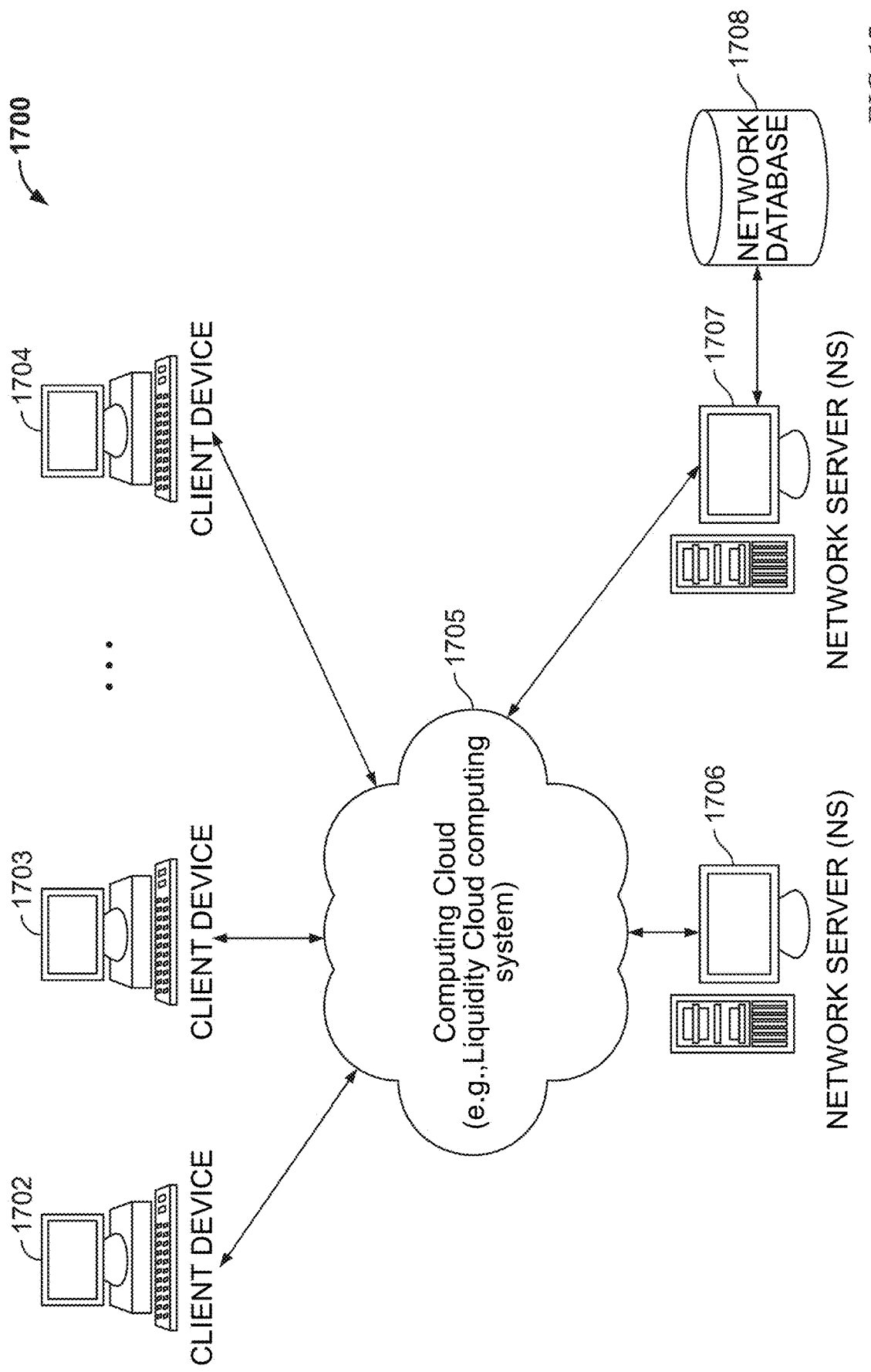

FIG. 17 illustrates one embodiment of an exemplary environment in which some embodiments of the exemplary inventive electronic execution-mediating platform of the present disclosure may operate. In some embodiments, exemplary inventive electronic execution-mediating platform of the present disclosure may host a large number of users (e.g., at least 1,000, at least 10,000; at least 100,000; at least 1,000,000) and/or is capable of conducting a large number of concurrent transactions such electronic communication sessions (e.g., at least 1,000; at least 10,000; at least 100,000; at least 1,000,000). In some embodiments, the exemplary inventive electronic execution-mediating platform of the present disclosure is based on a scalable computer and network architecture that incorporates varies strategies for assessing the data, caching, searching, and database connection pooling. An example of the scalable architecture is an architecture that is capable of operating multiple servers.

Referring to FIG. 17, the exemplary inventive electronic execution-mediating platform of the present disclosure may include users utilizing computing devices 1702-1704 that are capable of interacting (e.g., receiving and sending electronic communications) to and from another computing devices and computing systems/architectures, such as Internet could 1705, servers 1706 and 1707, each other, and the like. In some embodiments, the set of such computing devices includes devices that connect using a wired communications medium such as personal computers, multiprocessor systems, microprocessor-based or programmable consumer electronics, network PCs, and the like. In some embodiments, the set of such computing devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. In embodiments, each member device within member devices 102-104 may include a browser application that is configured to receive and to send web pages, and the like. In embodiments, the browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like. In embodiments, the disclosure is programmed in either Java or .Net.

In some embodiments, the computing devices 1702-1704 may be further configured to receive a message from another computing device employing another mechanism, including, but not limited to email, Short Message Service (SMS), Multimedia Message Service (MMS), instant messaging (IM), internet relay chat (IRC), mIRC, Jabber, and the like.

In some embodiments, the exemplary network 1705 of the exemplary inventive electronic execution-mediating platform of the present disclosure may be configured to have a cloud computing architecture. For example, the exemplary inventive liquidity cloud architecture may have the exemplary Internet cloud architecture 1705 that may include servers 1706-1707, running and/or in electronic communication with one or more databases such as database 1708 (e.g., liquidity database).

Figure 18:
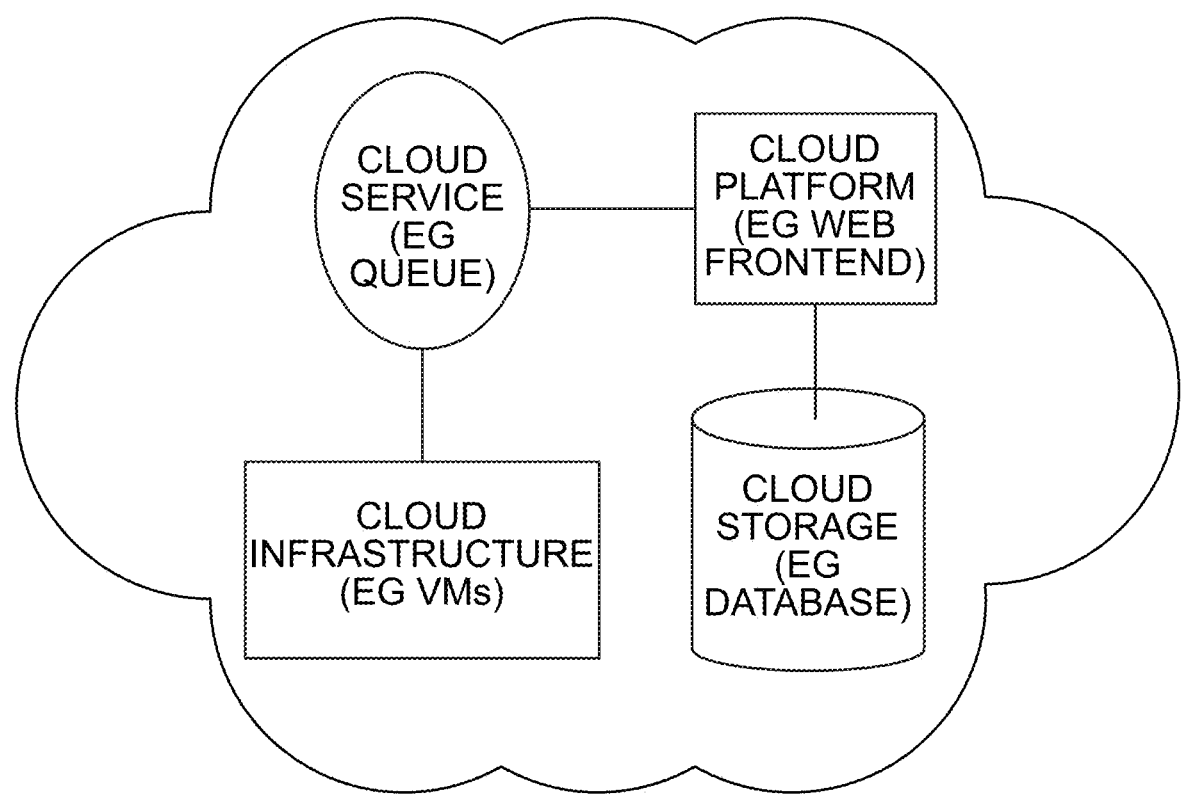
Figure 19:
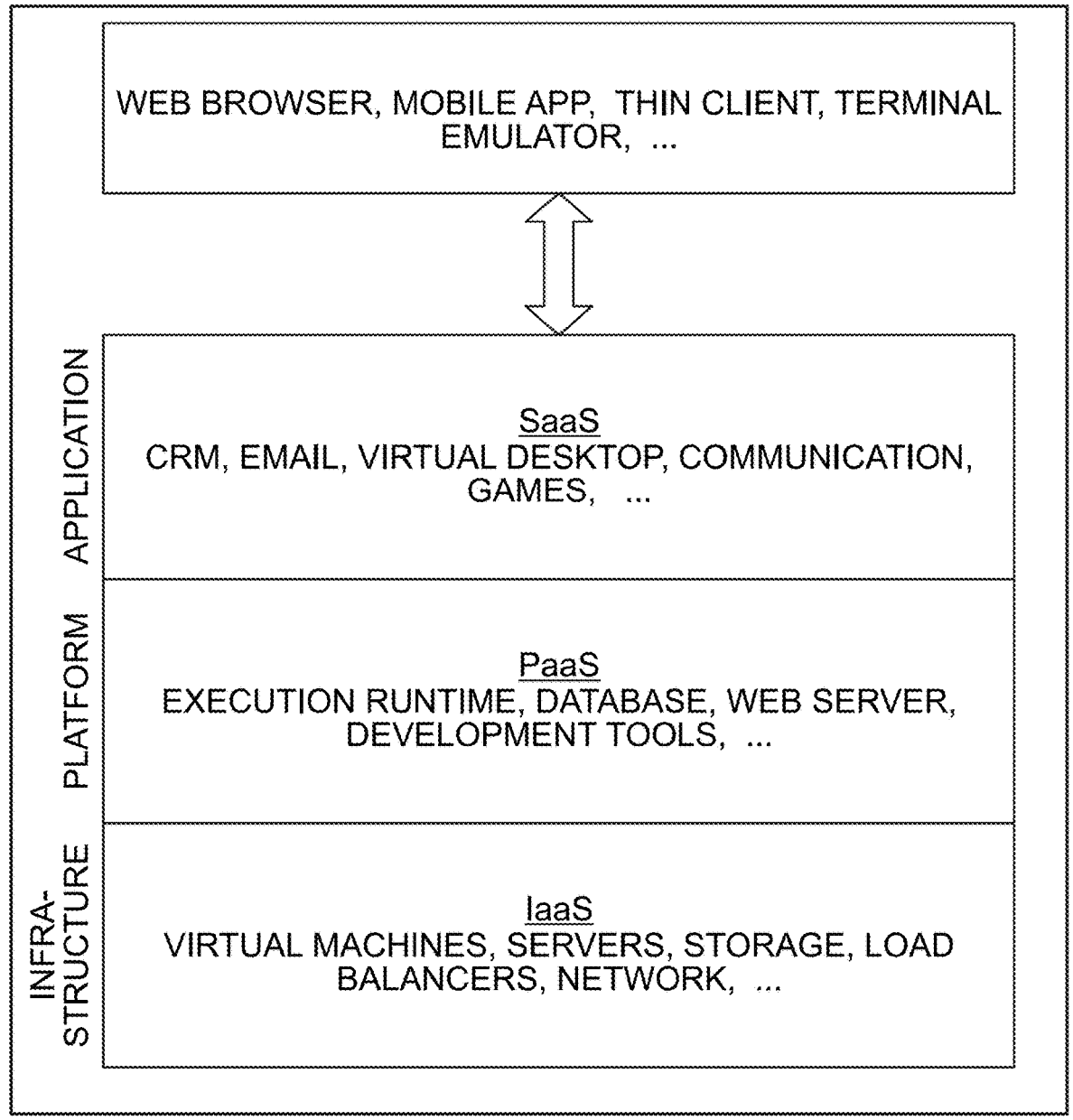

As used herein, the terms "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). FIGS. 18 and 19 illustrate schematics of exemplary implementations of the cloud computing/architectures that the exemplary inventive electronic execution-mediating platform of the present disclosure may be configured as in accordance with at least some embodiments of the present disclosure. For example, the exemplary inventive electronic execution-mediating platform of the present disclosure may be configured as, but not limiting to: infrastructure a service (IaaS), platform as a service (PaaS), and software as a service (SaaS).

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

Among those benefits and improvements that have been disclosed, other objects and advantages of this present disclosure can become apparent from the following description taken in conjunction with the accompanying figures. Detailed embodiments of the present disclosure are disclosed herein; however, it is to be understood that the disclosed embodiments are merely illustrative of the present disclosure that may be embodied in various forms. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the present disclosure may be readily combined, without departing from the scope or spirit of the present disclosure. Further, when a particular feature, structure, or characteristic is described in connection with an implementation, it is submitted that it is within the knowledge of one skilled in the art to affect such feature, structure, or characteristic in connection with other implementations whether or not explicitly described herein.

The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

At least some aspects of the present disclosure will now be described with reference to the following numbered clauses.

Clause 1. A method including: receiving, by at least one processor, a session request from an initiating user; where the session request includes an electronic communication session over a cloud computing network for a transfer of a quantity of a position in at least one financial instrument from the initiating user to at least one session invitee; generating, by the at least one processor, a list of potential intermediate entities based at least in part on a respective dealer liquidity score associated with each potential intermediate entity of the potential intermediate entities; receiving, by the at least one processor, a selection from the initiating user identifying a selected intermediate entity of the potential intermediate entities to mediate the electronic communication session; enabling, by the at least one processor, the initiating user and the selected intermediate entity to negotiate attributes of the electronic communication session; generating, by the at least one processor, based on the attributes of the electronic communication session, a stack software object controlling a plurality of participation levels in the electronic communication session for each selected invitee of a set of selected invitees; where the plurality of participation levels includes: i) a locked stack participation level, ii) an unlocked stack participation level, and iii) an open stack participation level; receiving, by the at least one processor, an invitee selection from the selected intermediate entity indicating the set of selected invitees selected from a plurality of potential invitees; establishing, by the at least one processor, the electronic communication session, associated with an intermediary computing device of the selected intermediate entity; where the electronic communication session includes the stack software object; preventing, by the at least one processor, a respective invitee computing device associated with each respective selected invitee from accessing activities in the electronic communication session unless the respective selected invitee satisfies at least one first predetermined parameter based on the locked stack participation level of the stack software object; enabling, by the at least one processor, an initiating computing device associated with the initiating user to access in the electronic communication setting at a reserve level while preventing each respective invitee computing device associated with each respective selected invitee from accessing the activities in the electronic communication session unless the respective selected invitee satisfies at least one second predetermined parameter based on the unlocked stack participation level of the stack software object; and enabling, by the at least one processor, the initiating computing device associated with the initiating user and each respective invitee computing device associated with each respective selected invitee to access the activities in the electronic communication session based on the open stack participation level of the stack software object.

Clause 2. The method of clause 1, where the dealer liquidity score includes a calculated score assigned to each potential intermediate entity for the electronic communication session based at least in part on historical trading data of related financial instruments to the at least one financial instrument.

Clause 3. The method of clause 1, further including generating, by the at least one processor, an alert to a respective user computing associated with each respective selected invitee of the selected invitees to enable each respective selected invitee to join the electronic communication session according to the plurality of participation levels.

Clause 4. The method as recited in clause 1, where a dealer selection GUI further enable the selected intermediate entity to buy the at least a portion of the quantity of the position in the at least one financial instrument from the initiating user prior to the electronic communication session.

Clause 5. The method as recited in clause 1, where the stack software object provides options for each selected invitee of the set of selected invitees to submit respective trade parameters including a respective size and a respective level of a respective portion of the position in the at least one financial instrument.

Clause 6. The method as recited in clause 5, where the stack software object prevents each selected invitee of the set of selected invitees to submit respective trade parameters having lesser value than previously submitted trade parameters.

Clause 7. The method as recited in clause 1, where the stack software object is configured to anonymize each selected invitee in the electronic communication session.

Clause 8. The method as recited in clause 1, where the electronic communication session remains active until the quantity of the position in the at least one financial instrument is fully allocated.

Clause 9. The method as recited in clause 1, where a computing device associated with one or more of: the initiating user, the selected intermediate user and the set of selected invitees, interfaces with the electronic communication session using an application programming interface (API).

Clause 10. The method as recited in clause 1, further including: utilizing, by the at least one processor, a liquidity analytical model to predict a respective value indicative of a respective expected level of interest for each respective potential invitee of a plurality of potential invitees based on characteristics of the at least one financial instrument and transaction histories of each potential invitee; where each respective expected level of interest includes a respective probability of each respective potential invitee to execute a trade of a financial instrument having common attributes to the at least one financial instrument; and ranking, by the at least one processor, the plurality of potential invitees according to each respective value indicative of the respective expected level of interest.

Clause 11. A system including: at least one processor configured to: receive a session request from an initiating user; where the session request includes an electronic communication session over a cloud computing network for a transfer of a quantity of a position in at least one financial instrument from the initiating user to at least one session invitee; generate a list of potential intermediate entities based at least in part on a respective dealer liquidity score associated with each potential intermediate entity of the potential intermediate entities; receive a selection from the initiating user identifying a selected intermediate entity of the potential intermediate entities to mediate the electronic communication session; enable the initiating user and the selected intermediate entity to negotiate attributes of the electronic communication session; generate based on the attributes of the electronic communication session, a stack software object controlling a plurality of participation levels in the electronic communication session for each selected invitee of a set of selected invitees; where the plurality of participation levels includes: i) a locked stack participation level, ii) an unlocked stack participation level, and iii) an open stack participation level; receive an invitee selection from the selected intermediate entity indicating the set of selected invitees selected from a plurality of potential invitees; establish the electronic communication session, associated with an intermediary computing device of the selected intermediate entity; where the electronic communication session includes the stack software object; prevent a respective invitee computing device associated with each respective selected invitee from accessing activities in the electronic communication session unless the respective selected invitee satisfies at least one first predetermined parameter based on the locked stack participation level of the stack software object; enable an initiating computing device associated with the initiating user to access in the electronic communication setting at a reserve level while preventing each respective invitee computing device associated with each respective selected invitee from accessing the activities in the electronic communication session unless the respective selected invitee satisfies at least one second predetermined parameter based on the unlocked stack participation level of the stack software object; and enable the initiating computing device associated with the initiating user and each respective invitee computing device associated with each respective selected invitee to access the activities in the electronic communication session based on the open stack participation level of the stack software object.

Clause 12. The method of clause 11, where the dealer liquidity score includes a calculated score assigned to each potential intermediate entity for the electronic communication session based at least in part on historical trading data of related financial instruments to the at least one financial instrument;

Clause 13. The system of clause 11, where the at least one processor is further configured to generate an alert to a respective user computing device associated with each respective selected invitee of the selected invitees to enable each respective selected invitee to join the electronic communication session according to the plurality of participation levels.

Clause 14. The system as recited in clause 11, where a dealer selection GUI enables the selected intermediate entity to buy the at least a portion of the quantity of the position in the at least one financial instrument from the initiating user prior to the electronic communication session.

Clause 15. The system as recited in clause 11, where the stack software object provides options for each selected invitee of the set of selected invitees to submit respective trade parameters including a respective size and a respective level of a respective portion of the position in the at least one financial instrument.

Clause 16. The system as recited in clause 15, where the stack software object prevents each selected invitee of the set of selected invitees to submit respective trade parameters having lesser value than previously submitted trade parameters.

Clause 17. The system as recited in clause 11, where the stack software object is configured to anonymize each selected invitee in the electronic communication session.

Clause 18. The system as recited in clause 11, where the electronic communication session remains active until the quantity of the position in the at least one financial instrument is fully allocated.

Clause 19. The system as recited in clause 11, further including at least one application programming interface (API) enabling a respective at least one computing device associated with a respective one or more of: the initiating user, the selected intermediate user and the set of selected invitees, interfaces with the electronic communication session using an application programming interface (API).

Clause 20. The system as recited in clause 11, where the at least one processor is further configured to: utilize a liquidity analytical model to predict a respective value indicative of a respective expected level of interest for each respective potential invitee of a plurality of potential invitees based on characteristics of the at least one financial instrument and transaction histories of each potential invitee; where each respective expected level of interest includes a respective probability of each respective potential invitee to execute a trade of a financial instrument having common attributes to the at least one financial instrument; and rank the plurality of potential invitees according to each respective value indicative of the respective expected level of interest.

While a number of embodiments of the present disclosure have been described, it is understood that these embodiments are illustrative only, and not restrictive, and that many modifications may become apparent to those of ordinary skill in the art, including that the inventive methodologies, the inventive systems, and the inventive devices described herein can be utilized in any combination with each other. Further still, the various steps may be carried out in any desired order (and any desired steps may be added, and/or any desired steps may be eliminated).

What is claimed is:

1. A computer-implemented method comprising:
  receiving, at a computing device having one or more processors, historical trading data associated with previously executed trade transactions for a financial instrument by a plurality of candidate invitee users;
    wherein the historical trading data comprises, for each trade transaction, at least a price and quantity traded of the financial instrument;
  receiving, at the computing device, trading intentions from the plurality of candidate invitee users, each trading intention representing a price and a quantity at which its associated candidate invitee user would trade the financial instrument;
  modelling, at the computing device, a score for each candidate invitee user based on inputting into a machine learning model:
    the trading intentions of each candidate invitee user for the financial instrument and
    the historical trading data associated with each candidate invitee user,
    wherein the score is representative of a likelihood of successfully trading the financial instrument;
  establishing, by a computing device, an electronic communication session configured for trading the financial instrument between an initiating user and a plurality of selected invitee users;
    wherein the electronic communication session comprises a stack software object that controls at least one instance of the electronic communication session according to a set of participation levels;

coordinating, by the computing device via the stack software object, communications during the electronic communication session;

wherein a first participation level of the set of participation levels is configured to:

permit each invitee user to submit an offer to trade the financial instrument with the initiating user, wherein the electronic communication session is configured to:

determine, at the computing device, a plurality of offers from the plurality of invitee users, the plurality of offers, when aggregated, achieve a maximum value for a predetermined position, as communicated by the initiating user, in a target financial instrument; and transmit, from the computing device, to the plurality of invitee users an acceptance of each offer of the plurality of offers to aggregate the plurality of offers for the trade.

2. The computer-implemented method of claim 1, wherein the first participation level of the set of participation levels is configured to:

prevent each invitee user from viewing the offer of each other invitee user; and wherein a second participation level is configured to:

permit the initiating user to view an identification and at least one trade parameter of each offer of each invitee user.

3. The computer-implemented method of claim 1, wherein the first participation level of the set of participation levels is configured to:

permit each invitee user from viewing the offer of each other invitee user; and wherein a second participation level is configured to:

permit the initiating user to view an identification and at least one trade parameter of each offer of each invitee user.

4. The computer-implemented method of claim 3, wherein the first participation level of the set of participation levels is configured to:

prevent each invitee user from viewing the identification of each other invitee user.

5. The computer-implemented method of claim 1, wherein establishing the electronic communication session further comprises:

transmitting an invite to each selected invitee user of the plurality of selected invitee users from the initiating user; and receiving a confirmation from at least one selected invitee user of the plurality of selected invitee user;

wherein the first participation level of the set of participation levels is configured to:

automatically submit at least one offer to trade the financial instrument with the initiating user, the at least one offer corresponding to at least one trading intention associated with the at least one selected invitee user.

6. The computer-implemented method of claim 5, wherein the invite comprises at least one of a price level, a size, or a side for trade of the financial instrument.

7. The computer-implemented method of claim 1, wherein a second participation level is configured to:

permit the initiating user to request at least one new offer from at least one selected invitee user.

8. The computer-implemented method of claim 1, wherein the electronic communication session is further configured to:

receive, at the computing device, two or more offer selections comprising two or more offers of the plurality of offers selected by the initiating user; and determine, at the computing device, a plurality of offers from the plurality of selected invitee users, the plurality of offers, when aggregated, achieve a maximum value for a predetermined position, as communicated by the initiating user, in a target financial instrument; and transmit, from the computing device, to two or more invitee users associated with the two or more offers, an acceptance of each offer of the two or more offers to aggregate the two or more offers for the trade.

9. The computer-implemented method of claim 1, wherein the plurality of offers are determined based at least in part on at least one preset parameter.

10. The computer-implemented method of claim 1, wherein a second participation level is further configured to permit the initiating user to end the electronic communication session upon user selection through cancellation, expiry, or trade.

11. The computer-implemented method of claim 1, wherein the plurality of candidate invitee users comprises at least one of:

at least one candidate dealer user, at least one candidate buyer user, or at least one candidate seller user.

12. The computer-implemented method of claim 1, wherein the initiating user comprises at least one of:

an initiating dealer user, an initiating buyer user, or an initiating seller user.

13. The computer-implemented method of claim 1, wherein the electronic communication session comprises a stack software object that controls at least one instance of the electronic communication session to selectively operate in accordance with a participation level of a set of participation levels.

14. The computer-implemented method of claim 13, wherein the stack software object comprises a first participation level and a second participation level of the set of participation levels.

15. The computer-implemented method of claim 1, wherein establishing the electronic communication session comprises:

presenting a list of the plurality of candidate invitee users and the score associated with each candidate invitee user; and receiving the selection of the plurality of selected invitee users from the initiating user.

16. A system comprising:

at least one processor in communication with a non-transitory computer readable medium having software instructions stored thereon, wherein upon execution the software instructions cause the at least one processor to:

receive historical trading data associated with previously executed trade transactions for a financial instrument by a plurality of candidate invitee users; wherein the historical trading data comprises, for each trade transaction, at least a price and quantity traded of the financial instrument;

receive trading intentions from the plurality of candidate invitee users, each trading intention representing a price and a quantity at which its associated candidate invitee user would trade the financial instrument;

model a score for each candidate invitee user based on inputting into a machine learning model:
the trading intentions of each candidate invitee user for the financial instrument and
the historical trading data associated with each candidate invitee user, wherein the score is representative of a likelihood of successfully trading the financial instrument;

establish an electronic communication session configured for trading the financial instrument between an initiating user and a plurality of selected invitee users;
wherein the electronic communication session comprises a stack software object that controls at least one instance of the electronic communication session according to a set of participation levels;

coordinate, via the stack software object, communications during the electronic communication session;
wherein a first participation level of the set of participation levels is configured to:
permit each invitee user to submit an offer to trade the financial instrument with the initiating user,
wherein the electronic communication session is configured to:
determine a plurality of offers from the plurality of invitee users, the plurality of offers, when aggregated, achieve a maximum value for a predetermined position, as communicated by the initiating user, in a target financial instrument; and
transmit to the plurality of invitee users an acceptance of each offer of the plurality of offers to aggregate the plurality of offers for the trade.

17. The system of claim 16,
wherein the first participation level of the set of participation levels is configured to:
prevent each invitee user from viewing the offer of each other invitee user; and
wherein a second participation level is configured to:
permit the initiating user to view an identification and at least one trade parameter of each offer of each invitee user.

18. The system of claim 16,
wherein the first participation level of the set of participation levels is configured to:
permit each invitee user from viewing the offer of each other invitee user; and
wherein a second participation level is configured to:
permit the initiating user to view an identification and at least one trade parameter of each offer of each invitee user.

19. The system of claim 18,
wherein the first participation level of the set of participation levels is configured to:
prevent each invitee user from viewing the identification of each other invitee user.

20. The system of claim 16, wherein establishing the electronic communication session further comprises:
transmitting an invite to each selected invitee user of the plurality of selected invitee users from the initiating user; and
receiving a confirmation from at least one selected invitee user of the plurality of selected invitee user;
wherein the first participation level of the set of participation levels is configured to:
automatically submit at least one offer to trade the financial instrument with the initiating user, the at least one offer corresponding to at least one trading intention associated with the at least one selected invitee user.

21. The system of claim 20, wherein the invite comprises at least one of a price level, a size, or a side for trade of the financial instrument.

22. The system of claim 16, wherein a second participation level is configured to:
permit the initiating user to request at least one new offer from at least one selected invitee user.

23. The system of claim 16, wherein the electronic communication session is further configured to:
receive, at the at least one processor, two or more offer selections comprising two or more offers of the plurality of offers selected by the initiating user; and
determine, at the at least one processor, a plurality of offers from the plurality of selected invitee users, the plurality of offers, when aggregated, achieve a maximum value for a predetermined position, as communicated by the initiating user, in a target financial instrument; and
transmit, from the at least one processor, to two or more invitee users associated with the two or more offers, an acceptance of each offer of the two or more offers to aggregate the two or more offers for the trade.

24. The system of claim 16, wherein the plurality of offers are determined based at least in part on at least one preset parameter.

25. The system of claim 16, wherein a second participation level is further configured to permit the initiating user to end the electronic communication session upon user selection through cancellation, expiry, or trade.

26. The system of claim 16, wherein the plurality of candidate invitee users comprises at least one of:
at least one candidate dealer user,
at least one candidate buyer user, or
at least one candidate seller user.

27. The system of claim 16, wherein the initiating user comprises at least one of:
an initiating dealer user,
an initiating buyer user, or
an initiating seller user.

28. The system of claim 16, wherein the electronic communication session comprises a stack software object that controls at least one instance of the electronic communication session to selectively operate in accordance with a participation level of a set of participation levels.

29. The system of claim 28, wherein the stack software object comprises a first participation level and a second participation level of the set of participation levels.

30. The system of claim 16, wherein establishing the electronic communication session comprises:
presenting a list of the plurality of candidate invitee users and the score associated with each candidate invitee user; and
receiving the selection of the plurality of selected invitee users from the initiating user.

* * * * *